United States Patent
Xu

(10) Patent No.: US 10,019,505 B2
(45) Date of Patent: Jul. 10, 2018

(54) METHOD AND APPARATUS FOR CREATING DATA CUBE IN STREAMING MANNER BASED ON DISTRIBUTED SYSTEM

(71) Applicant: Huawei Technologies Co., Ltd., Shenzhen, Guangdong (CN)

(72) Inventor: Kun Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 508 days.

(21) Appl. No.: 14/681,647

(22) Filed: Apr. 8, 2015

(65) Prior Publication Data
US 2015/0294001 A1    Oct. 15, 2015

(30) Foreign Application Priority Data
Apr. 11, 2014    (CN) .......................... 2014 1 0145878

(51) Int. Cl.
G06F 17/30    (2006.01)
(52) U.S. Cl.
CPC .............. G06F 17/30592 (2013.01)
(58) Field of Classification Search
None
See application file for complete search history.

(56) References Cited

U.S. PATENT DOCUMENTS

| 7,007,020 B1* | 2/2006 | Chen ................. G06F 17/30539 705/7.29 |
| 7,761,407 B1* | 7/2010 | Stern ................. G06F 17/30324 707/602 |
| 2008/0168375 A1 | 7/2008 | Papadimitriou et al. |
| 2009/0327330 A1 | 12/2009 | Abouzeid et al. |
| 2011/0131173 A1 | 6/2011 | Fernandez |
| 2011/0320398 A1 | 12/2011 | Abdellatif Abouzeid et al. |
| 2012/0130940 A1 | 5/2012 | Gattani et al. |
| 2013/0282650 A1* | 10/2013 | Zhang ............... G06F 17/30592 707/605 |
| 2013/0318031 A1 | 11/2013 | Bawa et al. |

FOREIGN PATENT DOCUMENTS

| CN | 102158531 A | 8/2011 |
| TW | 201140349 A | 11/2011 |

* cited by examiner

*Primary Examiner* — Khanh B Pham

(57) ABSTRACT

Embodiments of the present invention provide a method for creating a data cube in a streaming manner based on a distributed system. The method includes: receiving, by a processing node, a physical node diagram sent by a master node; determining, by the processing node, a structure of a to-be-computed data cube of the processing node according to the physical node diagram; if the processing node receives a query command sent by the master node, performing, according to the structure of the to-be-computed data cube of the processing node, an aggregation operation on a data stream received by the processing node, to generate a data cube; and sending, by the processing node, the data cube to the master node.

14 Claims, 12 Drawing Sheets

```
<Cube>
<node name="node0" parallel="2" function="Timestamp">
</node>
<node name="node1" parallel="2">
  <compose>
     <DimensionLevel  name="SrcIP.SrcCity"/>
     ...
  </compose>
</node>
<node name="node2" parallel="1">
  <compose>
     <DimensionLevel  name="SrcIP.SrcCity"/>
     <DimensionLevel  name="DstIp.DstCity"/>
     ...
  </compose>
  <compose>
     <DimensionLevel  name="SrcIp.SrcProvince"/>
     ...
  </compose>
</node>
<node name="node3" parallel="1">
  <compose>
     <DimensionLevel  name="DstIp.DstCity"/>
     ...
  </compose>
</node>
<Dimension name="SrcIP" foreignKey="SrcIP">
<Level name="SrcCountry" column="SrcCountry">
<Level name="SrcProvince" column="SrcProvince">
<Level name="SrcCity" column="SrcCity" node="node1">
<Level name="SrcIP" column="SrcIP" node="node0">
</Dimension>
<Dimension name="DstIP" foreignKey="DstIP">
...
<Level name="DstCity" column="DstCity" node="node1">
<Level name="DstIP" column="DstIP" node="node0">
</Dimension>
<Dimension name="EventTypeId" foreignKey="EventTypeId">
<Level name="EventCatalogy" column="EventCatalogy">
<Level name="EventTypeId" column="EventTypeId">
</Dimension>
<Dimension name="Inout" foreignKey="InoutId">
...
</Dimension>
<Measure name="count" aggregator="sum" column="count">
</Measure>
</Cube>
```

FIG. 3

METHOD AND APPARATUS FOR CREATING DATA CUBE IN STREAMING MANNER BASED ON DISTRIBUTED SYSTEM

CROSS-REFERENCE

This application claims priority to Chinese Patent Application No. 201410145878.4, filed on Apr. 11, 2014, which is hereby incorporated by reference in its entirety.

TECHNICAL FIELD

Embodiments of the present invention relate to the computer technologies, and in particular, to a method and an apparatus for creating a data cube in a streaming manner based on a distributed system.

BACKGROUND

In recent years, as network technologies develop rapidly, network security becomes particularly important. Generally, a decision-maker analyzes a current network security event in real time, so as to learn a current network security condition and dynamically assess a current network security situation. For a requirement on real-time quality of monitoring network security, the decision-maker usually pays attention to a recent overall network running situation, and does not care about historical data. In addition, network security events appear continuously and rapidly in a form of a data stream, and are characterized by real-time quality, a large data amount, a rapid change, and the like; and importance of data decreases gradually as time goes by. Therefore, to process an appearing event stream in time, a low-delay big data analysis engine is required. Based on this, a stream data multidimensional analysis (Stream On-Line Analytical Processing, hereinafter referred to as Stream OLAP) technology is developed, and the stream data multinational analysis technology is generally used for creating a stream data cube (Stream Cube) for all event streams in a time window, and on the stream cube, aggregating basic data from different dimensions and levels into high-dimensional data, so as to achieve an objective of multidimensional analysis. In a multidimensional model shown in FIG. 1, each dimension may include multiple levels, for example, a source Internet Protocol (source Internet Protocol, hereinafter referred to as source IP) dimension includes a source IP level, a source city (source city) level, a source province (source province) level, and a source country (source country) level. In FIG. 1, there are 1000 pieces of E1-type data whose IP is S1, there are 2000 pieces of E1-type data whose IP is S2, both S1 and S2 are IPs in a C1 city, and then the number of pieces of the E1-type data in the C1 city is 3000. Then, all pieces of data whose IPs belong to the C1 city are aggregated to generate a data cube, that is, the number of E1-type network events counted from an IP level to a city level.

In the prior art, a single machine (a single physical machine) performs an aggregation operation on a received data stream to aggregate the data stream into data cubes of different levels (that is, data cubes of different structures). For example, data at an IP level may be aggregated to a City level to generate a data cube 1, or data at an IP level may be aggregated to a Province level to generate a data cube 2.

However, in the prior art, when a same data stream is aggregated into data cubes of different structures, computing time is excessively long.

SUMMARY

Embodiments of the present invention provide a method and an apparatus for creating a data cube in a streaming manner based on a distributed system, which are used to solve a technical problem in the prior art that data cube (data cube) computing by a computer is slow and consumes a long time.

According to a first aspect, the present invention provides a method for creating a data cube in a streaming manner based on a distributed system, where the distributed system includes a master node, at least one first physical node, and at least one second physical node, and the method includes:

receiving, by a processing node, a physical node diagram sent by the master node, where the physical node diagram is generated by the master node according to a preset schema and a cluster resource, the processing node is any first physical node of a first logical node in the physical node diagram, the physical node diagram includes at least one first logical node and at least one second logical node, the first logical node includes at least one first physical node, the second logical node includes at least one second physical node, and the first logical node and the second logical node are connected;

determining, by the processing node, a structure of a to-be-computed data cube of the processing node according to the physical node diagram;

if the processing node receives a query command sent by the master node, performing, by the processing node according to the structure of the to-be-computed data cube of the processing node, an aggregation operation on a data stream received by the processing node, to generate a data cube, where the data stream carries a timestamp added by the second physical node to the data stream, and the timestamp indicates a moment at which the data stream flows into the second logical node; and sending, by the processing node, the data cube to the master node.

With reference to the first aspect, in a first possible implementation manner of the first aspect, the performing, by the processing node according to the structure of the to-be-computed data cube of the processing node, an aggregation operation on a data stream received by the processing node, to generate a data cube includes:

performing, by the processing node, an aggregation operation on a data stream in a first window unit in a time window of the processing node, to generate a first sub-data cube, where the time window includes at least one window unit, and a length of the time window is fixed;

performing, by the processing node, an aggregation operation on a data stream in a last window unit in the time window, to generate a second sub-data cube; and combining, by the processing node, the first sub-data cube, the second sub-data cube, and a sub-data cube that is obtained by aggregation in advance by the processing node and corresponds to one or more of other fully occupied window units in the time window, to generate the data cube.

With reference to the first possible implementation manner of the first aspect, in a second possible implementation manner of the first aspect, before the performing, by the processing node, an aggregation operation on a data stream in a first window unit in a time window of the processing node, to generate a first sub-data cube, the method further includes:

buffering, by the processing node, the data stream received by the processing node to a corresponding window unit in the time window according to the timestamp in the data stream;

performing, by the processing node, an aggregation operation on a data stream in a fully occupied window unit in the time window, to generate a sub-data cube, and marking the fully occupied window unit;

if the processing node determines that all window units in the time window are fully occupied, and a new data stream flows into the time window, generating, by the processing node, a new window unit as the first window unit of the time window; and buffering, by the processing node, the new data stream to the first window unit, and controlling a data stream that is in the last window unit of the time window and whose timestamp exceeds the length of the time window to flow out.

With reference to the first possible implementation manner of the first aspect or the second possible implementation manner of the first aspect, in a third possible implementation manner of the first aspect, the physical node diagram further includes an aggregation relationship that is established between the first logical nodes by the master node according to a principle of a minimum aggregation cost, and the data stream received by the processing node includes:

a basic data stream sent by an upper-level processing node of the processing node, where the basic data stream is a data stream on which an aggregation operation has not been performed, and the upper-level processing node is a physical node of a parent logical node of a first logical node on which the processing node is located; or a sub-data cube sent by an upper-level processing node of the processing node, where the sub-data cube is a data stream on which an aggregation operation has been performed.

According to a second aspect, the present invention provides a method for creating a data cube in a streaming manner based on a distributed system, where the distributed system includes a master node, at least one first physical node, and at least one second physical node, and the method includes:

generating, by the master node, a physical node diagram according to a preset schema and a cluster resource, where the physical node diagram includes at least one first logical node and at least one second logical node, the first logical node includes at least one first physical node, the second logical node includes at least one second physical node, and the first logical node and the second logical node are connected;

sending, by the master node, the physical node diagram to a processing node, so that the processing node determines a structure of a to-be-computed data cube of the processing node according to the physical node diagram, where the processing node is any first physical node of the first logical node in the physical node diagram;

sending, by the master node, a query command to the processing node, so that the processing node performs, according to the structure of the to-be-computed data cube of the processing node, an aggregation operation on a data stream received by the processing node, to generate a data cube, where the data stream carries a timestamp added by the second physical node to the data stream, and the timestamp indicates a moment at which the data stream flows into the second logical node; and receiving, by the master node, the data cube sent by the processing node.

With reference to the second aspect, in a first possible implementation manner of the second aspect, the generating, by the master node, a physical node diagram according to a preset schema and a cluster resource specifically includes:

generating, by the master node, a node level diagram according to the preset schema, where the node level diagram is used for showing a level relationship between different data cubes, and each node in the node level diagram indicates a data cube of one structure;

establishing, by the master node, an aggregation relationship between the first logical nodes according to a principle of a minimum aggregation cost; and generating a logical node diagram according to the aggregation relationship, the node level diagram, and all logical nodes defined in the schema; and generating, by the master node, the physical node diagram according to the logical node diagram, a parallelism degree of all the logical nodes defined in the schema, and the cluster resource.

With reference to the second aspect, in a second possible implementation manner of the second aspect, before the sending, by the master node, a query command to the processing node, the method further includes:

receiving, by the master node, a query statement sent by a client; and determining, by the master node, a to-be-queried logical node according to the query statement.

With reference to the second possible implementation manner of the second aspect, in a third possible implementation manner of the second aspect, if the to-be-queried logical node is a first logical node on which the processing node is located, the master node sends the data cube to the client.

With reference to the second possible implementation manner of the second aspect, in a fourth possible implementation manner of the second aspect, if the to-be-queried logical node is a third logical node and the third logical node is a node that is not in the physical node diagram, the master node determines, according to a node level diagram and a principle of a minimum aggregation cost, that a first logical node on which the processing node is located is a logical node from which aggregation is performed to the third logical node at a minimum cost;

the master node performs, according to a structure of a data cube on the third logical node, an aggregation operation on the data cube sent by the processing node, to generate a new data cube; and the master node sends the new data cube to the client.

According to a third aspect, the present invention provides an apparatus for creating a data cube in a streaming manner based on a distributed system, where the distributed system includes a master node, at least one first physical node, and at least one second physical node, and the apparatus includes:

a receiving module, configured to receive a physical node diagram sent by the master node, where the physical node diagram is generated by the master node according to a preset schema and a cluster resource, the apparatus is any first physical node of a first logical node in the physical node diagram, the physical node diagram includes at least one first logical node and at least one second logical node, the first logical node includes at least one first physical node, the second logical node includes at least one second physical node, and the first logical node and the second logical node are connected;

a processing module, configured to determine a structure of a to-be-computed data cube of the processing module according to the physical node diagram;

a generating module, configured to: when the receiving module receives a query command sent by the master node, perform, according to the structure of the to-be-computed data cube of the processing module, an aggregation operation on a data stream received by the processing module, to generate a data cube, where the data stream carries a timestamp added by the second physical node to the data stream, and the timestamp indicates a moment at which the data stream flows into the second logical node; and a sending module, configured to send the data cube to the master node.

With reference to the third aspect, in a first possible implementation manner of the third aspect, the generating module includes:

a first generating subunit, configured to perform an aggregation operation on a data stream in a first window unit in a time window of the apparatus, to generate a first sub-data cube, where the time window includes at least one window unit, and a length of the time window is fixed;

a second generating subunit, configured to perform an aggregation operation on a data stream in a last window unit in the time window, to generate a second sub-data cube; and a combining subunit, configured to combine the first sub-data cube, the second sub-data cube, and a sub-data cube that is obtained by aggregation in advance by the processing node and corresponds to one or more of other fully occupied window units in the time window, to generate the data cube.

With reference to the first possible implementation manner of the third aspect, in a second possible implementation manner of the third aspect, the generating module further includes:

a buffer subunit, configured to: before the first generating subunit generates the first sub-data cube, buffer a data stream received by the buffer subunit to a corresponding window unit in the time window according to a timestamp in the data stream;

a third generating subunit, configured to perform an aggregation operation on a data stream in a fully occupied window unit in the time window, to generate a sub-data cube, and mark the fully occupied window unit; and a fourth generating subunit, configured to: if the apparatus determines that all window units in the time window are fully occupied, and a new data stream flows into the time window, generate a new window unit as the first window unit of the time window;

where the buffer subunit is further configured to buffer the new data stream to the first window unit, and control a data stream that is in the last window unit of the time window and whose timestamp exceeds the length of the time window to flow out.

With reference to the first possible implementation manner of the third aspect or the second possible implementation manner of the third aspect, in a third possible implementation manner of the third aspect, the physical node diagram further includes an aggregation relationship that is established between the first logical nodes by the master node according to a principle of a minimum aggregation cost, and the data stream received by the buffer subunit includes:

a basic data stream sent by an upper-level apparatus of the apparatus, where the basic data stream is a data stream on which an aggregation operation has not been performed, and the upper-level apparatus is a physical node of a parent logical node of a first logical node on which the apparatus is located; or a sub-data cube sent by an upper-level apparatus of the apparatus, where the sub-data cube is a data stream on which an aggregation operation has been performed.

According to a fourth aspect, the present invention provides an apparatus for creating a data cube in a streaming manner based on a distributed system, where the distributed system includes the apparatus, at least one first physical node, and at least one second physical node, and the apparatus includes:

a first generating module, configured to generate a physical node diagram according to a preset schema and a cluster resource, where the physical node diagram includes at least one first logical node and at least one second logical node, the first logical node includes at least one first physical node, the second logical node includes at least one second physical node, and the first logical node and the second logical node are connected;

a first sending module, configured to send the physical node diagram to a processing node, so that the processing node determines a structure of a to-be-computed data cube of the processing node according to the physical node diagram, where the processing node is any first physical node of the first logical node in the physical node diagram;

a second sending module, configured to send a query command to the processing node, so that the processing node performs, according to the structure of the to-be-computed data cube of the processing node, an aggregation operation on a data stream received by the processing node, to generate a data cube, where the data stream carries a timestamp added by the second physical node to the data stream, and the timestamp indicates a moment at which the data stream flows into the second logical node; and a first receiving module, configured to receive the data cube sent by the processing node.

With reference to the fourth aspect, in a first possible implementation manner of the fourth aspect, the first generating module specifically includes:

a first generating subunit, configured to generate a node level diagram according to the preset schema, where the node level diagram is used for showing a level relationship between different data cubes, and each node in the node level diagram indicates a data cube of one structure;

a second generating subunit, configured to establish an aggregation relationship between the first logical nodes according to a principle of a minimum aggregation cost; and generate a logical node diagram according to the aggregation relationship, the node level diagram, and all logical nodes defined in the schema; and a third generating subunit, configured to generate the physical node diagram according to the logical node diagram, a parallelism degree of all the logical nodes defined in the schema, and the cluster resource.

With reference to the fourth aspect, in a second possible implementation manner of the fourth aspect, the apparatus further includes:

a second receiving module, configured to: before the second sending module sends the query command to the processing node, receive a query statement sent by a client; and a determining module, configured to determine a to-be-queried logical node according to the query statement.

With reference to the second possible implementation manner of the fourth aspect, in a third possible implementation manner of the fourth aspect, the apparatus further includes a third sending module, and the third sending module is configured to: if the to-be-queried logical node is a first logical node on which the processing node is located, send the data cube to the client.

With reference to the second possible implementation manner of the fourth aspect, in a fourth possible implementation manner of the fourth aspect, the apparatus further includes a second generating module, and if the to-be-queried logical node is a third logical node and the third logical node is a node that is not in the physical node diagram, the determining module is further configured to determine, according to a node level diagram and a principle of a minimum aggregation cost, that a first logical node on which the processing node is located is a logical node from which aggregation is performed to the third logical node at a minimum cost;

the second generating module is configured to perform, according to a structure of a data cube on the third logical node, an aggregation operation on the data cube sent by the processing node, to generate a new data cube; and the third sending module is further configured to send the new data cube to the client.

According to the method and the apparatus for creating a data cube in a streaming manner based on a distributed system that are provided in the embodiments of the present invention, a processing node receives a physical node diagram sent by a master node; determines a structure of a to-be-computed data cube of the processing node according to the physical node diagram; when receiving a query command sent by the master node, performs an aggregation operation on a data stream received by the processing node, to generate a data cube; and sends the data cube to the master node. According to the method provided in the embodiments, an aggregation operation can be separately performed on a data stream by using multiple processing nodes, to generate data cubes of different structures; and when a distributed system includes multiple physical machines (that is, each processing node corresponds to one physical machine), a data stream can be aggregated into data cubes of different structures by using the multiple physical machines, thereby accelerating data cube computing, and improving the efficiency of querying a data cube by a client.

BRIEF DESCRIPTION OF DRAWINGS

To describe the technical solutions in the embodiments of the present invention t more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 3 is a schematic diagram of a schema according to the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
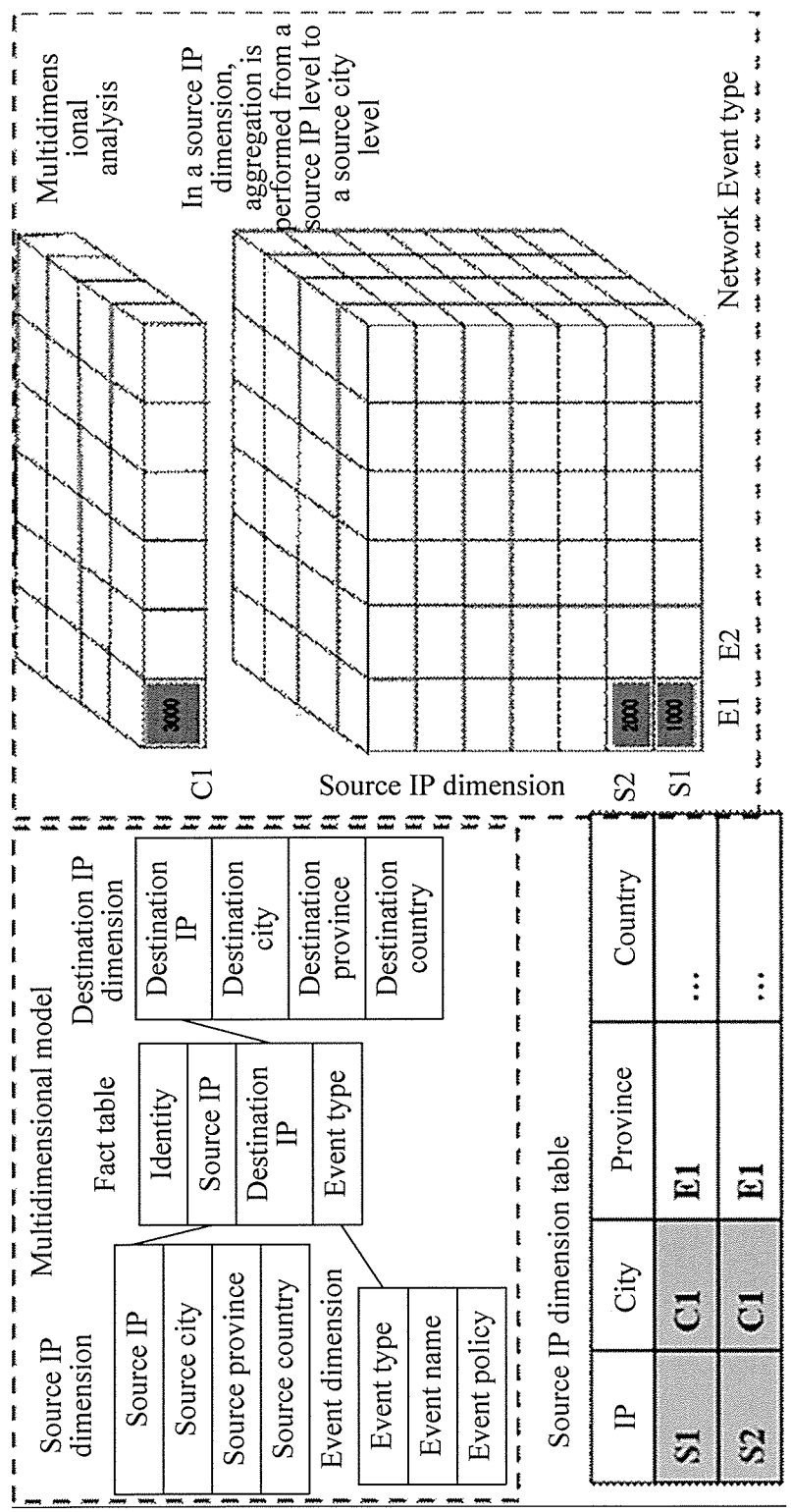
FIG. 1 is a schematic diagram of a multidimensional model according to the present invention.
Figure 2:
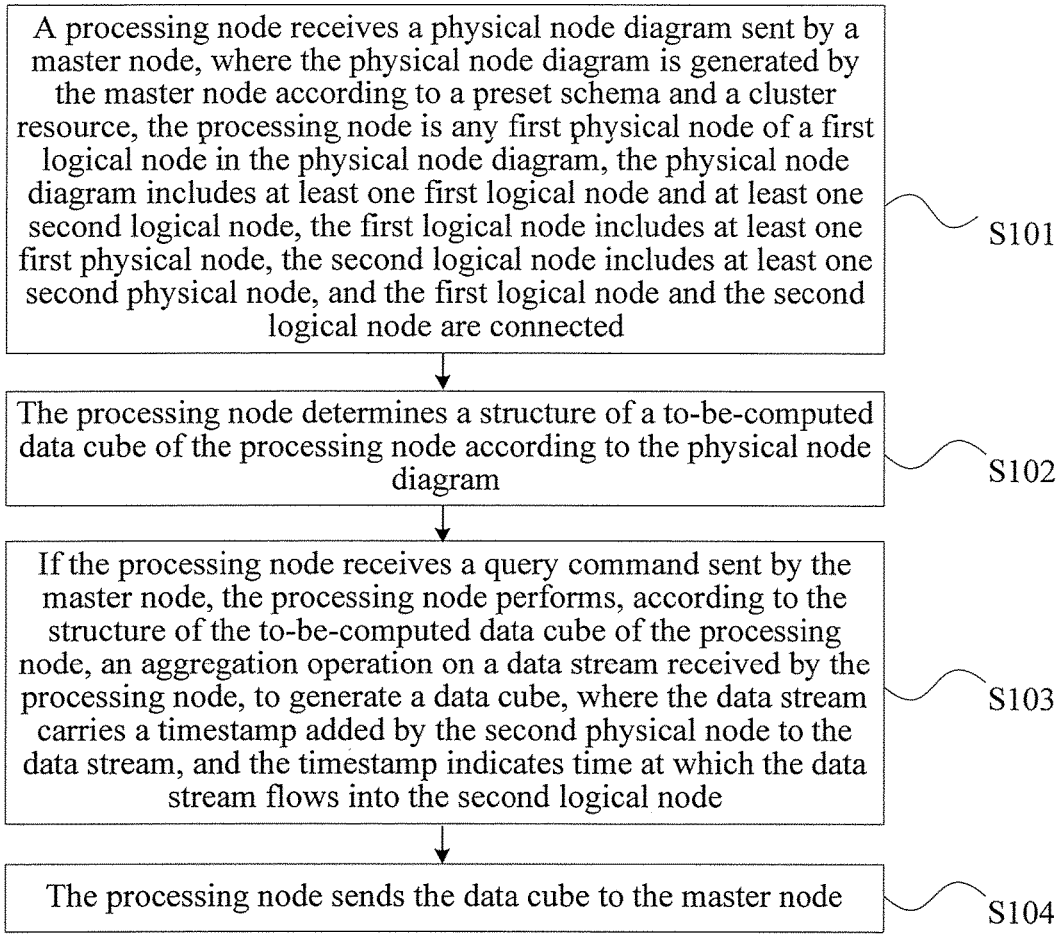
FIG. 2 is a schematic flowchart of Embodiment 1 of a method for creating a data cube in a streaming manner based on a distributed system according to the present invention.

FIG. 2 is a schematic flowchart of Embodiment 1 of a method for creating a data cube in a streaming manner based on a distributed system according to the present invention. The distributed system includes a master node, at least one first physical node, and at least one second physical node. The master node, the first physical node, and the second physical node that are mentioned herein may each correspond to one physical machine (for example, a computer), that is, the distributed system herein may include multiple physical machines; or the master node, the first physical node, and the second physical node may be all deployed on one physical machine, where the master node herein may be equivalent to a controller, which manages and controls all physical nodes, on the physical machine, and the first physical node or the second physical node may be a processing unit or a processing module on the physical machine. That is, the distributed system may also include one physical machine. As shown in FIG. 2, the method includes:

S101: A processing node receives a physical node diagram sent by the master node, where the physical node diagram is generated by the master node according to a preset schema (schema) and a cluster resource, the processing node is any first physical node of a first logical node in the physical node diagram, the physical node diagram includes at least one first logical node and at least one second logical node, the first logical node includes at least one first physical node, the second logical node includes at least one second physical node, and the first logical node and the second logical node are connected.

Specifically, the master node generates the physical node diagram according to the preset schema and the cluster resource, where the preset schema herein may be uploaded to the master node by an administrator, or may be obtained by the master node by using a valid resource such as a website or a database; and the cluster resource herein may be at least one physical machine. The master node generates a node level diagram by parsing the schema and according to level dependence in the schema. The node level diagram is used for showing a level relationship (that is, level dependence between different nodes in the node level diagram) between different data cubes (that is, data cube), and each node in the node level diagram indicates a data cube of one structure. Reference may be made to FIG. 3 for a model of the schema, and reference may be made to FIG. 4 for the node level diagram.

In FIG. 3, some logical nodes are defined in the Schema model, but functions of these logical nodes are not the same. For example, a Node0 needs to perform an operation of adding a timestamp to data flowing into the Node0, where the Node0 is the second logical node in this embodiment; and a parallelism degree (parallel)=2 indicates that two second physical nodes for adding a timestamp (Timestamp) are deployed on the second logical node (Node0). A Node1 needs to perform an operation of aggregating data at a source IP level to a source city level, where the Node1 is a first logical node in this embodiment, and two first physical nodes for performing an aggregation operation are deployed on the first logical node. A Node2 needs to perform an operation of aggregating data at a source IP level to a source city level, where the Node2 is also a first logical node in this embodiment, and one first physical node for performing an aggregation operation is also deployed on the first logical node. A Node3 needs to perform an operation of aggregating data at a destination IP level to a destination city level, where the Node3 is also a first logical node in this embodiment, and one first physical node for performing an aggregation operation is deployed on the first logical node. In other words, in this embodiment, the first logical node and the first physical node are nodes for performing an aggregation operation, and the second logical node and the second physical node are nodes for adding a timestamp to a data stream. In addition, FIG. 3 also shows levels included in different dimensions, for example: a source IP dimension includes a source Country level, a source Province level, a source City level, and a source IP level; and a destination IP dimension includes a destination city level and a destination IP level.

Figure 4:
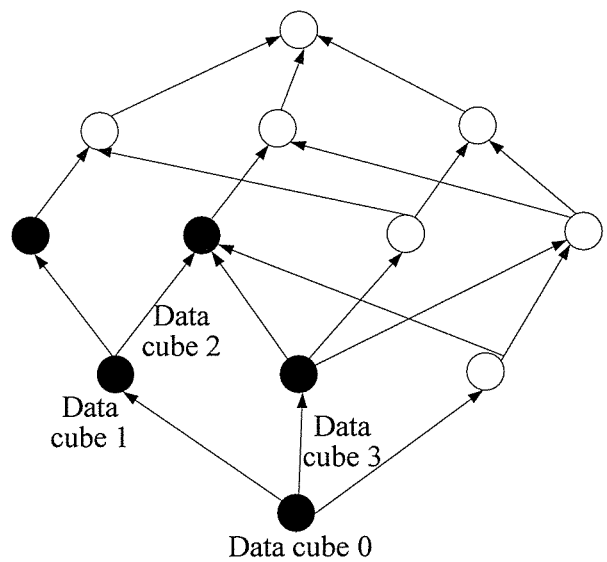
FIG. 4 is a node level diagram according to the present invention.
Figure 5:
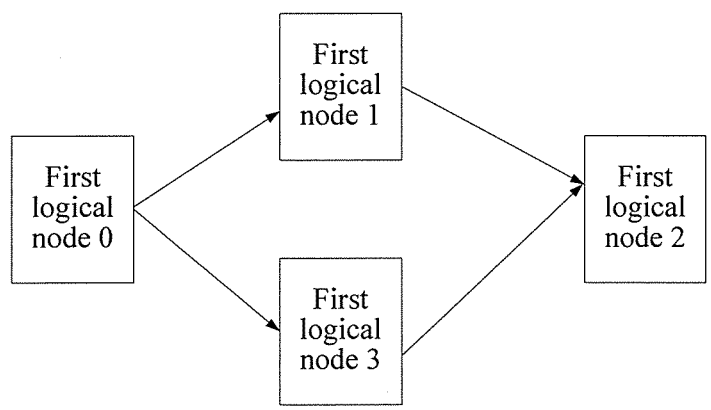
FIG. 5 is a logical node diagram according to the present invention.

FIG. 4 is a node level diagram generated by the master node. Each node in the node level diagram indicates a data cube of one structure, and the node level diagram is used for showing a level relationship (that is, level dependence between different nodes in the node level diagram) between different data cubes. The master node establishes an aggregation relationship between the first logical nodes according to all logical nodes defined in the schema and a principle of a minimum aggregation cost; and generates, according to the aggregation relationship, the node level diagram, and all the logical nodes defined in the schema, a logical node diagram shown in FIG. 5. For example, a Node0 shown in FIG. 5 represents a data cube 0, and a structure of the data cube 0 is the data cube 0 (source IP, destination IP, Event-type Id, . . . ), where the source IP represents a source IP level in a source IP dimension, and the destination city represents a destination city level in a destination IP dimension, that is, a data cube actually refers to data at different levels in different dimensions. In the logical node diagram shown in FIG. 5, a data cube 1 may be obtained by aggregation from the data cube 0, that is, the data cube 1 is generated by aggregating data at a source IP level of the data cube 0 to a source city level, where a structure of the data cube 1 is the data cube 1 (source city, destination IP, Event-type Id, . . . ); and a data cube 3 is generated by aggregating data at a destination IP level of the data cube 0 to a destination city level, where a structure of the data cube 3 is the data cube 3 (source IP, destination city, Event-type Id, . . . ). The principle of a minimum aggregation cost herein means that a higher-level data cube may be obtained by aggregation from multiple lower-level data cubes, and in terms of an aggregation cost of aggregation from the lower-level data cubes to form the higher-level data cube, a lower-level data cube with a minimum aggregation cost is selected, so as to generate the logical node diagram. For example, in the logical node diagram shown in FIG. 5, a data cube 2 may be obtained by aggregation from the data cube 1, or may be obtained by aggregation from the data cube 3, but after comparing aggregation costs of the data cube 1 and the data cube 3, the master node selects a data cube with a minimum aggregation cost, to form the data cube 2. The logical node diagram shown in FIG. 5 actually indicates dependence between data cubes during aggregation from a data cube.

Figure 6:
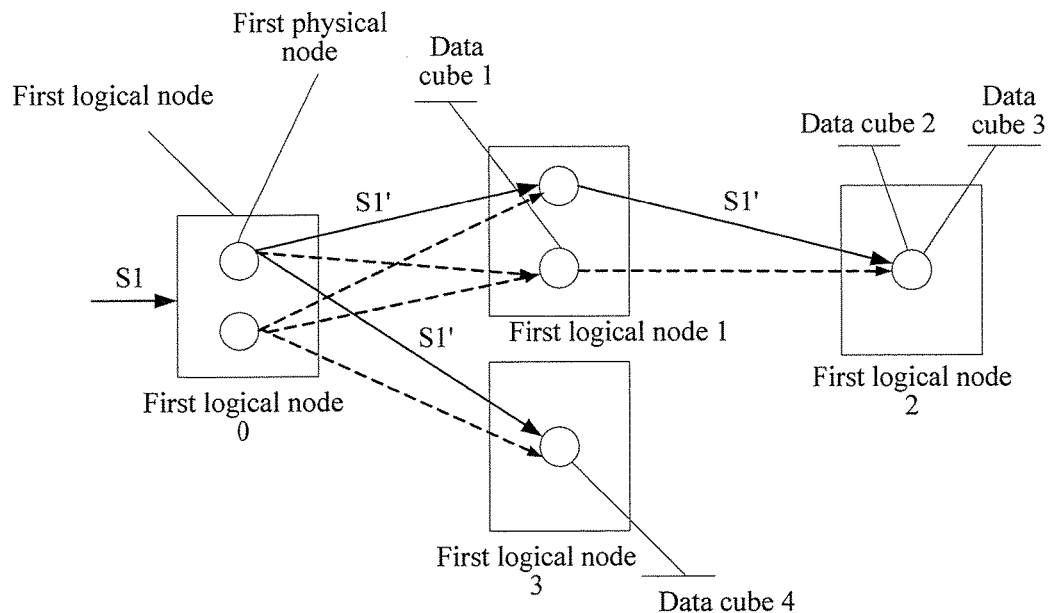
FIG. 6 is a physical node diagram according to the present invention.

Then, the master node generates, according to the logical node diagram and the cluster resource, a physical node diagram shown in FIG. 6, that is, the master node deploys a physical node on a corresponding logical node according to a parallelism degree of each logical node. In FIG. 6, a Node0 corresponds to the Node0 (the second logical node) shown in FIG. 5, and the master node deploys two physical nodes for the Node0 according to a parallelism degree of the Node0; a Node1 corresponds to the Node1 (the first logical node) shown in FIG. 5, and the master node deploys two physical nodes for the Node1 according to a parallelism degree of the Node1; a Node3 corresponds to the Node3 (the first logical node) shown in FIG. 5, and the master node deploys one physical node for the Node3 according to a parallelism degree of the Node3; and a Node2 corresponds to the Node2 (the first logical node) shown in FIG. 5, and the master node deploys one physical node for the Node2 according to a parallelism degree of the Node2.

Finally, the master node delivers an instruction to some physical nodes in the physical node diagram, the physical nodes receiving the instruction serve as processing nodes, and the master node delivers the physical node diagram to these processing nodes.

S102: The processing node determines a structure of a to-be-computed data cube of the processing node according to the physical node diagram.

Specifically, according to content described in S101 in the foregoing, the processing node may obtain a level structure of the to-be-computed data cube of the processing node according to the physical node diagram, and each processing node corresponds to a data cube of at least one structure. Herein, there may be one processing node or may be multiple processing nodes. That is, each processing node may receive the physical node diagram sent by the master node, and learns a structure of a data cube of each processing node according to the physical node diagram. In the physical node diagram shown in FIG. 6, a data cube 1, a data cube 2, a data cube 3, and a data cube 4 all refer to data cubes of different structures. That is, in this embodiment, a data stream may be aggregated into data cubes of different structures by using multiple processing nodes, so as to perform OLAP analysis. When the distributed system includes multiple physical machines, these processing nodes may each correspond to a physical machine. That is, in this embodiment, a data stream may be aggregated into data cubes of different structures by using multiple physical machines, so as to perform OLAP analysis, and therefore, fast processing is achieved. In addition, in this embodiment of the present invention, all basic data streams may be stored in memories of multiple physical machines, so that a technical problem in the prior art that because a basic data stream is stored in a memory and external storage due to a limitation of a single machine, query is slow is avoided. That is, according to the method provided in this embodiment of the present invention, a speed of querying a data cube can be increased, and moreover, according to the method provided in this embodiment of the present invention, a system throughput can also be improved. Certainly, the method in this embodiment is also applicable to a scenario in which the distributed system includes only one physical machine.

However, in the prior art, data streams are aggregated into data cubes of multiple structures by using one physical machine; therefore, computing is slow, and an overhead of the physical machine is relatively high.

S103: If the processing node receives a query command sent by the master node, the processing node performs, according to the structure of the to-be-computed data cube of the processing node, an aggregation operation on a data stream received by the processing node, to generate a data cube, where the data stream carries a timestamp added by the second physical node to the data stream, and the timestamp indicates a moment at which the data stream flows into the second logical node.

Specifically, after the processing node receives the query command sent by the master node, a timestamp is added to a data stream S1 on the second physical node of the second logical node (Node0), to generate a stream S1', where the timestamp indicates a moment at which the data stream S1 flows into the second logical node; the stream S1' needs to flow into all first logical nodes (Node1, Node3) at a next level; in the Node1, the stream S1' can enter only one of first physical nodes; and when the stream S1' enters the first physical node, an aggregation operation is performed to generate a data cube.

Figure 7:
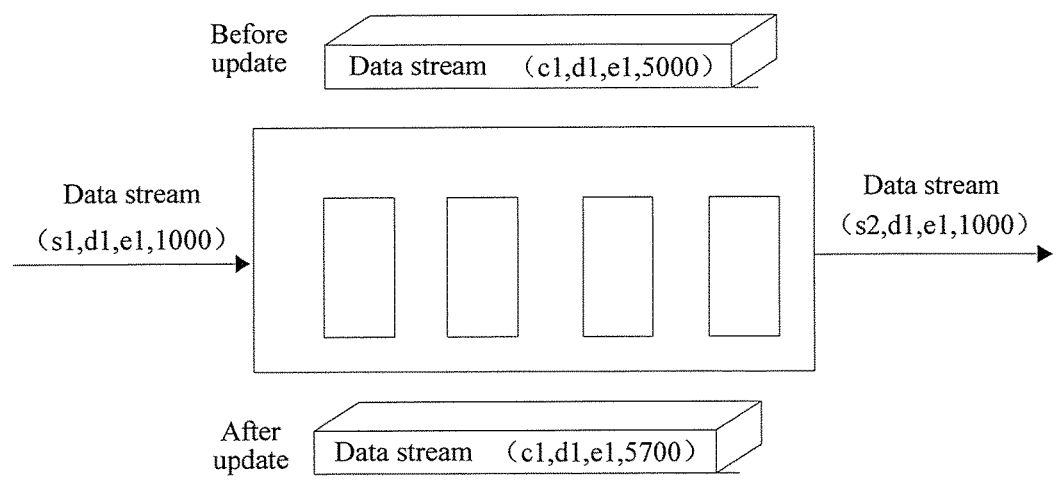
FIG. 7 is a schematic diagram of an aggregation operation according to the present invention.

Optionally, the query command sent by the master node may be a statement for querying a data cube, where the statement for querying a data cube is sent by a client to the master node; after parsing the statement for querying, the master node learns a structure of a data cube that the client wants to query; and then the master node sends a query command to a processing node corresponding to the data cube structure, so that the processing node may perform an aggregation operation shown in FIG. 7, to generate a data cube. In FIG. 7, a tuple is a basic data stream, and a type of the data stream is tuple (S1, d1, e1, 1000), that is, a value of the data stream at a source IP level in a source IP dimension is s1, that is, a source IP of the data stream is s1; and there are 1000 pieces of data of this type (both s1 and s2 in the figure are IPs belonging to a c1 city). When the data stream flows into the processing node, a type of a data stream of the processing node (which may also be a structure of a data cube on the processing node) is tuple (c1, d1, e1, 5000), where c1 indicates source city, that is, the processing node performs an operation of aggregating the data stream from s1 to the c1 city. After the aggregation, a data cube generated on the processing node is tuple (c1, d1, e1, 5700), and the processing node makes data whose s2 belongs to the c1 city flow out.

S104: The processing node sends the data cube to the master node.

Specifically, the processing node sends the generated data cube to the master node, so that the master node sends the data cube to the client.

According to the method for creating a data cube in a streaming manner based on a distributed system that is provided in this embodiment of the present invention, a processing node receives a physical node diagram sent by a master node; determines a structure of a to-be-computed data cube data cube of the processing node according to the physical node diagram; when receiving a query command sent by the master node, performs an aggregation operation on a data stream received by the processing node, to generate a data cube; and sends the data cube to the master node. According to the method provided in this embodiment, an aggregation operation can be separately performed on a data stream by using multiple processing nodes, to generate data cubes of different structures; and when a distributed system includes multiple physical machines (that is, each processing node corresponds to one physical machine), a data stream can be aggregated into data cubes of different structures by using the multiple physical machines, thereby accelerating data cube computing, and improving the efficiency of querying a data cube by a client.

Figure 8:
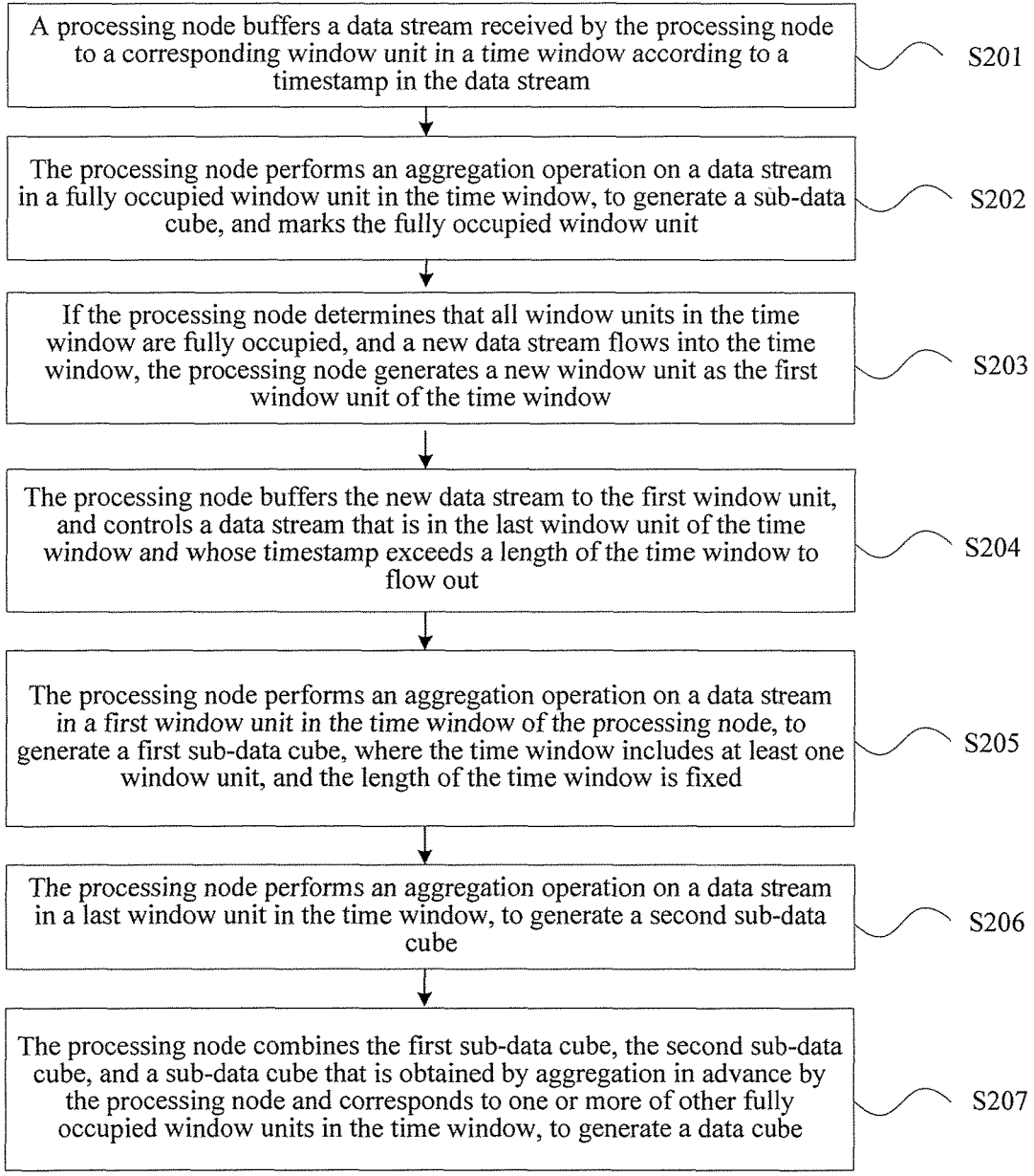
FIG. 8 is a schematic flowchart of Embodiment 2 of a method for creating a data cube in a streaming manner based on a distributed system according to the present invention.

FIG. 8 is a schematic flowchart of Embodiment 2 of a method for creating a data cube in a streaming manner based on a distributed system according to the present invention. The method involved in this embodiment describes a specific procedure in which a processing node generates a data cube, which specifically includes:

S201: A processing node buffers a data stream received by the processing node to a corresponding window unit in a time window according to a timestamp in the data stream.

Figure 9:
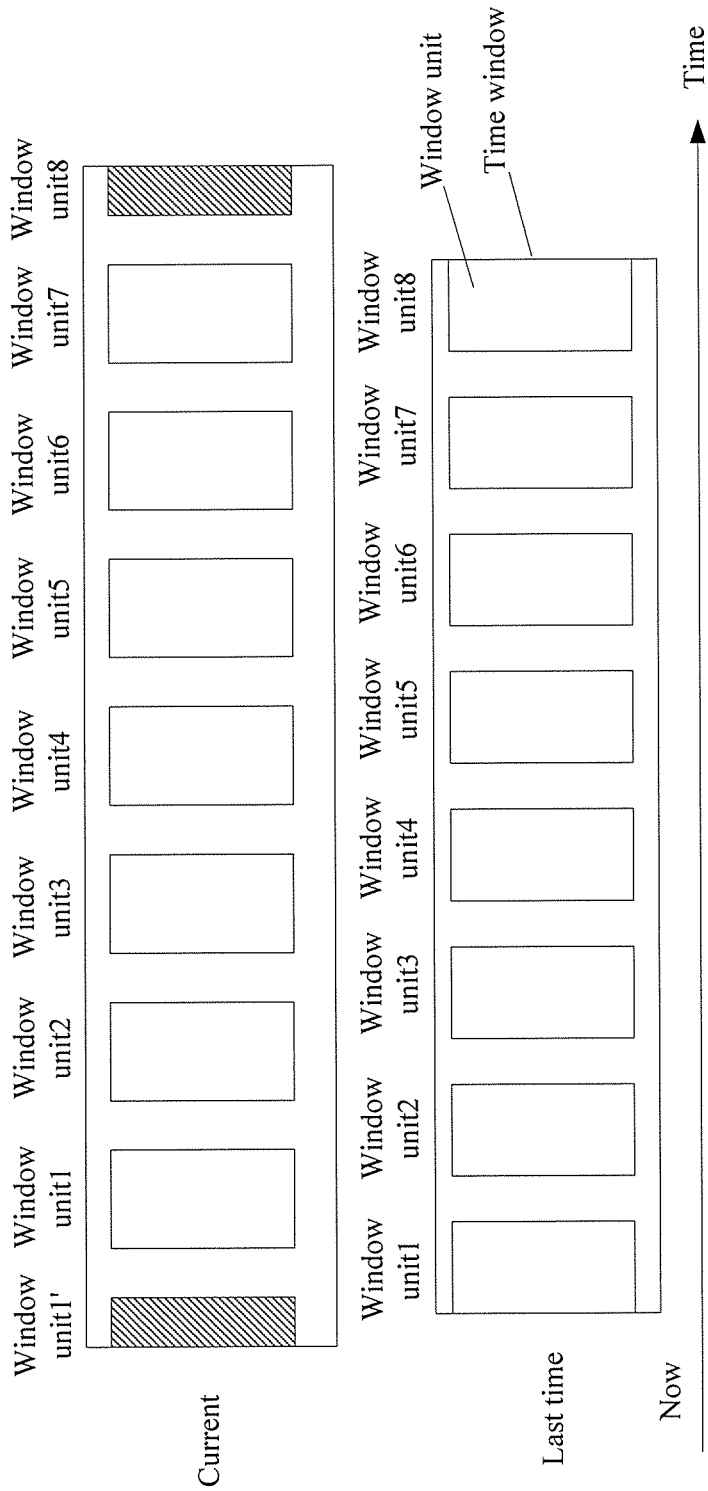
FIG. 9 is a schematic diagram of a time window according to the present invention.

Specifically, as shown in FIG. 6, a timestamp is added to a data stream S1 on a second physical node of a second logical node (Node0), to generate a stream S1', where the timestamp indicates a moment at which the data stream S1 flows into the second logical node; the stream S1' needs to flow into all first logical nodes (Node1, Node3) at a next level; in the Node1, the stream S1' can enter only one of first physical nodes, where the first physical node is a processing node; and the processing node stores the data stream S1' in a corresponding window unit in a time window according to the timestamp in the S1'. The time window of the processing node includes at least one window unit, and each window unit includes at least one buffer unit for storing a tuple. Referring to FIG. 9, the time window includes eight window units (unit1-unit8). Because data streams flow into the processing node one by one in a streaming manner, that is, the data streams are actually stored in the window units in the time window of the processing node one by one. Generally, according to a timestamp in a data stream, a data stream that flows into the processing node first is stored in the last window unit, a data stream that subsequently flows into the processing node is stored in a former window unit in a queue-like form, and a data stream that flows into the processing node last is stored in the first window unit of the time window.

S202: The processing node performs an aggregation operation on a data stream in a fully occupied window unit in the time window, to generate a sub-data cube, and marks the fully occupied window unit.

When any window unit in the time window is fully occupied with data streams, the processing node performs an aggregation operation, as shown in FIG. 7, on the data streams in the fully occupied window unit, to generate a sub-data cube, and marks the fully occupied window unit as a computed unit.

S203: If the processing node determines that all window units in the time window are fully occupied, and a new data stream flows into the time window, the processing node generates a new window unit as the first window unit of the time window.

S204: The processing node buffers the new data stream to the first window unit, and controls a data stream that is in the last window unit of the time window and whose timestamp exceeds a length of the time window to flow out.

Specifically, the processing node performs an aggregation operation, as shown in FIG. 7, on each fully occupied window unit, and marks the fully occupied window unit. When the processing node determines that all window units in the time window are fully occupied, and a new data stream flows into the time window, the processing node generates a new window unit (referring to unit1' shown in FIG. 9) as the first window unit of the time window, to store the new data stream. In addition, when the new data stream flows into the first window unit, because a time length of the time window is fixed, the processing node controls a data stream that is in the last window unit of the time window to flow out, where a time indicated by a timestamp of the data stream exceeds the length of the time window; however, sub-data cubes generated in window units (original unit1-unit7) in the middle of the time window are not changed.

S205: The processing node performs an aggregation operation on a data stream in a first window unit in the time window of the processing node, to generate a first sub-data cube, where the time window includes at least one window unit, and the length of the time window is fixed.

S206: The processing node performs an aggregation operation on a data stream in a last window unit in the time window, to generate a second sub-data cube.

Specifically, a new data stream continuously flows into the first window unit in the time window, and a data stream also continuously flows out of the last window unit. When the processing node receives a query command sent by a master node, the processing node performs an aggregation operation on a data stream in a first window unit (at this time, the first window unit has not been fully occupied with data streams), to generate a first sub-data cube; and performs an aggregation operation on a remaining data stream in the last window unit, to generate a second sub-data cube.

S207: The processing node combines the first sub-data cube, the second sub-data cube, and a sub-data cube that is obtained by aggregation in advance by the processing node and corresponds to one or more of other fully occupied window units in the time window, to generate a data cube.

Specifically, because fully occupied window units in the middle of the time window are not affected, sub-data cubes generated in advance in the window units also keep an original state; therefore, the processing node needs to combine only the first sub-data cube, the second sub-data cube, and sub-data cubes correspond to other fully occupied window units (the original unit1-unit7) in the time window, to generate a data cube of the processing node.

In the prior art, when a processing node receives a query command sent by a master node, the processing node directly performs, from a bottom level, an aggregation operation on data streams flowing into the processing node, to generate a data cube; and when the processing node continuously receives the query command, the processing node repeatedly performs, from the bottom level, an aggregation operation on all data streams saved by the processing node, which causes that computer querying becomes slow. However, in the present invention, because of design of a time window and window units, an aggregation operation is performed on data streams in some fully occupied window units in advance, to generate a sub-data cube. Therefore, when receiving a query command, the processing node needs to compute only data streams in the first window unit and the last window unit and then perform an aggregation operation, which can effectively shorten query time of a computer.

Optionally, a physical node diagram further includes an aggregation relationship that is established between the first logical nodes by the master node according to a principle of a minimum aggregation cost, and the data stream received by the processing node includes: a basic data stream sent by an upper-level processing node of the processing node, where the basic data stream is a data stream on which an aggregation operation has not been performed, and the upper-level processing node is a physical node of a parent logical node of a first logical node on which the processing node is located; or a sub-data cube sent by an upper-level processing node of the processing node, where the sub-data cube is a data stream on which an aggregation operation has been performed.

Specifically, as shown in FIG. 6, assuming that the processing node is a first physical node in a Node2, the upper-level processing node of the processing node is a first physical node in the Node1, and a data stream received in the Node2 is a data stream flowing from the first physical node in the Node1, where the data stream may be a basic data stream flowing from the Node1, or may be a sub-data cube obtained after the first physical node of the Node1 performs an aggregation operation on the basic data stream. If the data stream is the sub-data cube obtained after the first physical node of the Node1 performs an aggregation operation, when the Node2 needs to generate a data cube, the Node2 may generate, by using the sub-data cube, a data cube required by the Node2, so that the Node2 is prevented from aggregating data from a bottom level, and in this way, data cube computing time can be saved.

According to the method for creating a data cube in a streaming manner based on a distributed system that is provided in this embodiment of the present invention, a time window of a processing node is divided into at least one window unit, and an aggregation operation is performed on a data stream in a fully occupied window unit in advance, to generate a sub-data cube; when the time window is fully occupied and a new data stream flows into the time window, a new window unit is generated as the first window unit of the time window; an aggregation operation is performed separately on a data stream in a first window unit and a data stream in a last window unit, to generate a first sub-data cube and a second sub-data cube; and finally, the first sub-data cube, the second sub-data cube, and a sub-data cube corresponding to one or more of other fully occupied window units in the time window are combined, to generate a data cube corresponding to the processing node. According to the method provided in this embodiment of the present invention, query time of a computer is effectively reduced and a query speed is increased.

Figure 10:
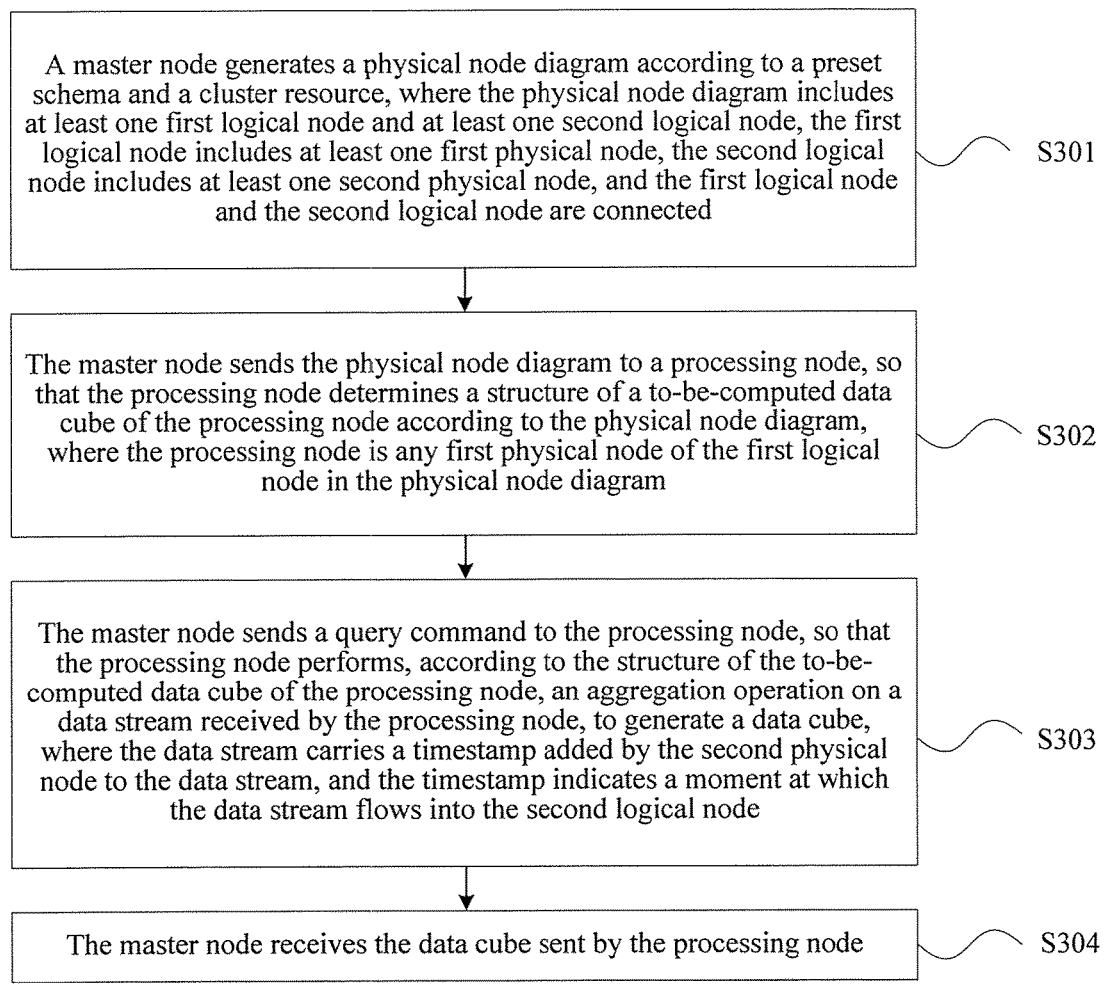
FIG. 10 is a schematic flowchart of Embodiment 3 of a method for creating a data cube in a streaming manner based on a distributed system according to the present invention.

FIG. 10 is a schematic flowchart of Embodiment 3 of a method for creating a data cube in a streaming manner based on a distributed system according to the present invention. The distributed system includes a master node, at least one first physical node, and at least one second physical node. The master node, the first physical node, and the second physical node that are mentioned herein may each correspond to one physical machine (for example, a computer), that is, the distributed system herein may include multiple physical machines; or the master node, the first physical node, and the second physical node may be all deployed on one physical machine, where the master node herein may be equivalent to a controller, which manages and controls a physical node, on the physical machine, and the first physical node or the second physical node may be a processing unit or a processing module on the physical machine. That is, the distributed system may also include one physical machine. As shown in FIG. 3, the method includes:

S301: The master node generates a physical node diagram according to a preset schema and a cluster resource, where the physical node diagram includes at least one first logical node and at least one second logical node, the first logical node includes at least one first physical node, the second logical node includes at least one second physical node, and the first logical node and the second logical node are connected.

Specifically, the master node generates the physical node diagram according to the preset schema and the cluster resource, where the preset schema herein may be uploaded to the master node by an administrator, or may be obtained by the master node by using a valid resource such as a website or a database; and the cluster resource herein may be at least one physical machine. The first logical node and the first physical node that are included in the physical node diagram are nodes for performing an aggregation operation on a data stream, and the second logical node and the second physical node that are included in the physical node diagram are nodes for adding a timestamp to a data stream.

S302: The master node sends the physical node diagram to a processing node, so that the processing node determines a structure of a to-be-computed data cube of the processing node according to the physical node diagram, where the processing node is any first physical node of the first logical node in the physical node diagram.

Specifically, the master node delivers an instruction to some physical nodes in the physical node diagram, the physical nodes receiving the instruction serve as processing nodes, and the master node delivers the physical node diagram to these processing nodes. The processing node may obtain a level structure of the to-be-computed data cube of the processing node according to the physical node diagram, and each processing node may correspond to a data cube of at least one structure. Herein, there may be one processing node or may be multiple processing nodes. That is, each processing node may receive the physical node diagram sent by the master node, and learns a structure of a data cube of each processing node according to the physical node diagram. That is, in this embodiment, a data stream may be aggregated into data cubes of different structures by using multiple processing nodes, so as to perform OLAP analysis. When the distributed system includes multiple physical machines, these processing nodes may each correspond to a physical machine. That is, in this embodiment, a data stream may be aggregated into data cubes of different structures by using multiple physical machines, so as to perform OLAP analysis, and therefore, fast processing is achieved. Certainly, the method in this embodiment is also applicable to a scenario in which the distributed system includes only one physical machine.

However, in the prior art, data streams are aggregated into data cubes of multiple structures by using one physical machine; therefore, computing is slow, and an overhead of the physical machine is relatively high.

S303: The master node sends a query command to the processing node, so that the processing node performs, according to the structure of the to-be-computed data cube of the processing node, an aggregation operation on a data stream received by the processing node, to generate a data cube, where the data stream carries a timestamp added by the second physical node to the data stream, and the timestamp indicates a moment at which the data stream flows into the second logical node.

Specifically, a client sends a statement for querying a data cube to the master node; after parsing the statement for querying, the master node learns a structure of a data cube that the client wants to query; and then the master node sends a query command to a processing node corresponding to the data cube structure. After the processing node receives the query command sent by the master node, a timestamp is added to a data stream S1 on the second physical node of the second logical node, to generate a stream S1', where the timestamp indicates a moment at which the data stream S1 flows into the second logical node; the stream S1' needs to flow into all first logical nodes at a next level; in the first logical node, the stream S1' can enter only one of first physical nodes; when the stream S1' enters the first physical node, the processing node performs an aggregation operation on the data stream according to the data cube structure of the processing node, to generate a data cube; and finally the processing node sends the data cube to the master node.

S304: The master node receives the data cube sent by the processing node.

According to the method for creating a data cube in a streaming manner based on a distributed system that is provided in this embodiment of the present invention, a master node generates a physical node diagram according to a preset schema and a cluster resource, and delivers the physical node diagram to a processing node, so that the processing node determines a structure of a to-be-computed data cube data cube of the processing node according to the physical node diagram, when receiving a query command delivered by the master node, performs an aggregation operation on a data stream received by the processing node, to generate a data cube, and sends the data cube to the master node. According to the method provided in this embodiment, an aggregation operation can be separately performed on a data stream by using multiple processing nodes, to generate data cubes of different structures; and when a distributed system includes multiple physical machines, a data stream can be aggregated into data cubes of different structures by using the multiple physical machines, thereby accelerating data cube computing, and improving the efficiency of querying a data cube by a client.

Figure 11:
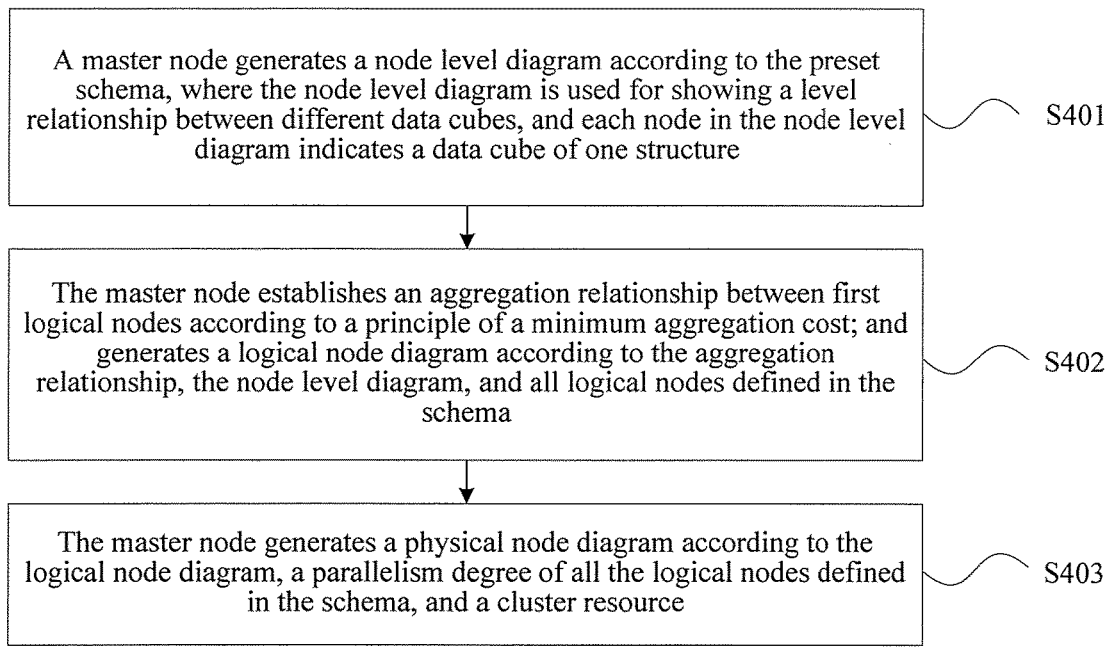
FIG. 11 is a schematic flowchart of Embodiment 4 of a method for creating a data cube in a streaming manner based on a distributed system according to the present invention.

FIG. 11 is a schematic flowchart of Embodiment 4 of a method for creating a data cube in a streaming manner based on a distributed system according to the present invention. The method involved in this embodiment describes a specific procedure in which a master node generates a physical node diagram. As shown in FIG. 11, S301 in the foregoing specifically includes:

S401: The master node generates a node level diagram according to the preset schema, where the node level diagram is used for showing a level relationship between different data cubes, and each node in the node level diagram indicates a data cube of one structure.

Specifically, the master node generates the physical node diagram according to the preset schema and the cluster resource, where the preset schema herein may be uploaded to the master node by an administrator, or may be obtained by the master node by using a valid resource such as a website or a database; and the cluster resource herein may be at least one physical machine. The master node generates a node level diagram by parsing the schema and according to a level dependence in the schema. The node level diagram is used for showing a level relationship (that is, level dependence between different nodes in the node level diagram) between different data cubes, and each node in the node level diagram indicates a data cube of one structure. Reference may be made to FIG. 3 for a model of the schema, and reference may be made to FIG. 4 for the node level diagram.

In FIG. 3, some logical nodes are defined in the schema, but functions of these logical nodes are not the same. For example, a Node0 needs to perform an operation of adding a timestamp to data flowing into the Node0, where the Node0 is a second logical node in this embodiment; and a parallelism degree (parallel)=2 indicates that two second physical nodes for adding a timestamp are deployed on the second logical node (Node0). A Node1 needs to perform an operation of aggregating data at a source IP level to a source city level, where the Node1 is a first logical node in this embodiment, and two first physical nodes for performing an aggregation operation are deployed on the first logical node. A Node2 needs to perform an operation of aggregating data at a source IP level to a source city level, where the Node2 is also a first logical node in this embodiment, and two first physical nodes for performing an aggregation operation are also deployed on the first logical node. A Node3 needs to perform an operation of aggregating data at a destination IP level to a destination city level, where the Node3 is also a first logical node in this embodiment, and one first physical node for performing an aggregation operation is deployed on the first logical node. In other words, in this embodiment, the first logical node and the first physical node are nodes for performing an aggregation operation, and the second logical node and the second physical node are nodes for adding a timestamp to a data stream. In addition, FIG. 3 also shows levels included in different dimensions, for example: a source IP dimension includes a source Country level, a source Province level, a source City level, and a source IP level; and a destination IP dimension includes a destination city level and a destination IP level.

FIG. 4 is a node level diagram generated by the master node. Each node in the node level diagram indicates a data cube of one structure, and the node level diagram is used for showing a level relationship (that is, level dependence between different nodes in the node level diagram) between different data cubes.

S402: The master node establishes an aggregation relationship between the first logical nodes according to a principle of a minimum aggregation cost, and generates a logical node diagram according to the aggregation relationship, the node level diagram, and all logical nodes defined in the schema.

Specifically, the master node establishes an aggregation relationship between the first logical nodes according to all logical nodes defined in the schema and a principle of a minimum aggregation cost; and generates, according to the aggregation relationship, the node level diagram, and all the logical nodes defined in the schema, a logical node diagram shown in FIG. 5. For example, a Node0 shown in FIG. 5 represents a data cube 0, and a structure of the data cube 0 is the data cube 0 (source IP, destination IP, Event-type Id, . . . ), where the source IP represents a source IP level in a source IP dimension, and the destination city represents a destination city level in a destination IP dimension, that is, a data cube actually refers to data at different levels in different dimensions. In the logical node diagram shown in FIG. 5, a data cube 1 may be obtained by aggregation from the data cube 0, that is, the data cube 1 is generated by aggregating data at a source IP level of the data cube 0 to a source city level, where a structure of the data cube 1 is the data cube 1 (source city, destination IP, Event-type Id, . . . ); and a data cube 3 is generated by aggregating data at a destination IP level of the data cube 0 to a destination city level, where a structure of the data cube 3 is the data cube 3 (source IP, destination city, Event-type Id, . . . ). The principle of a minimum aggregation cost herein means that a higher-level data cube may be obtained by aggregation from multiple lower-level data cubes, and in terms of an aggregation cost of aggregation from the lower-level data cubes to form the higher-level data cube, a lower-level data cube with a minimum aggregation cost is selected, so as to generate the logical node diagram. For example, in the logical node diagram shown in FIG. 5, a data cube 2 may be obtained by aggregation from the data cube 1, or may be obtained by aggregation from the data cube 3, but after comparing aggregation costs of the data cube 1 and the data cube 3, the master node selects a data cube with a minimum aggregation cost, to form the data cube 2. The logical node diagram shown in FIG. 5 actually indicates dependence between data cubes during aggregation from a data cube.

S403: The master node generates the physical node diagram according to the logical node diagram, a parallelism degree of all the logical nodes defined in the schema, and the cluster resource.

Specifically, the master node generates, according to the logical node diagram and the cluster resource, a physical node diagram shown in FIG. 6, that is, the master node deploys a physical node on a corresponding logical node according to a parallelism degree of each logical node. In FIG. 6, a Node0 corresponds to the Node0 (the second logical node) shown in FIG. 5, and the master node deploys two physical nodes for the Node0 according to a parallelism degree of the Node0; a Node1 corresponds to the Node1 (the first logical node) shown in FIG. 5, and the master node deploys two physical nodes for the Node1 according to a parallelism degree of the Node1; a Node3 corresponds to the Node3 (the first logical node) shown in FIG. 5, and the master node deploys one physical node for the Node3 according to a parallelism degree of the Node3; and a Node2 corresponds to the Node2 (the first logical node) shown in FIG. 5, and the master node deploys one physical node for the Node2 according to a parallelism degree of the Node2.

Finally, the master node delivers an instruction to some physical nodes in the physical node diagram, the physical nodes receiving the instruction serve as processing nodes, and the master node delivers the physical node diagram to these processing nodes. The processing node may obtain a level structure of the to-be-computed data cube of the processing node according to the physical node diagram, and each processing node corresponds to a data cube of at least one structure. Herein, there may be one processing node or may be multiple processing nodes. That is, each processing node may receive the physical node diagram sent by the master node, and learns a structure of a data cube of each processing node according to the physical node diagram. In the physical node diagram shown in FIG. 6, a data cube 1, a data cube 2, a data cube 3, and a data cube 4 all refer to data cubes of different structures. That is, in this embodiment, a data stream may be aggregated into data cubes of different structures by using multiple processing nodes, so as to perform OLAP analysis. When the distributed system includes multiple physical machines, these processing nodes may each correspond to a physical machine. That is, in this embodiment, a data stream may be aggregated into data cubes of different structures by using multiple physical machines, so as to perform OLAP analysis, and therefore, fast processing is achieved. Certainly, the method in this embodiment is also applicable to a scenario in which the distributed system includes only one physical machine.

After the processing node receives a query command sent by the master node, a timestamp is added to a data stream S1 on the second physical node of the second logical node (Node0), to generate a stream S1', where the timestamp indicates a moment at which the data stream S1 flows into the second logical node; the stream S1' needs to flow into all first logical nodes (Node1, Node3) at a next level; in the Node1, the stream S1' can enter only one of first physical nodes; and when the stream S1' enters the first physical node, an aggregation operation shown in FIG. 7 is performed, to generate a data cube. Reference may be made to Embodiment 1 for the aggregation operation shown in FIG. 7, and details are not described herein again.

Optionally, the query command sent by the master node may be a statement for querying a data cube, where the statement for querying a data cube is sent by a client to the master node; after parsing the statement for querying, the master node determines a to-be-queried logical node, that is, learns a logical node corresponding to a structure of a data cube the client wants to query and then sends the query command to the processing node.

Optionally, if the to-be-queried logical node determined by the master node is a first logical node on which the processing node is located, the master node directly sends the generated data cube to the client.

Optionally, if the to-be-queried logical node determined by the master node is a third logical node and the third logical node is not a node shown in the physical node diagram, the master node determines, according to a node level diagram and a principle of a minimum aggregation cost, a first logical node that is in the physical node diagram and performs aggregation to the third logical node at a minimum cost; and uses each first physical node on the determined first logical node as a processing node. Then, the master node delivers the query command to all first physical nodes (that is, all processing nodes on the first logical node) on the first logical node, so that all the first physical nodes on the first logical node perform an aggregation operation on a data stream according to data cube structures of all the first physical nodes, to generate their respective data cubes; and send the data cubes to the master node. Finally, the master node performs again, according to a data cube structure on the third logical node, an aggregation operation on the data cubes sent by these processing nodes, to generate a new data cube; and sends the new data cube to the client.

According to the method for creating a data cube in a streaming manner based on a distributed system that is provided in this embodiment of the present invention, a master node generates a node level diagram by parsing a preset schema, establishes an aggregation relationship between first logical nodes according to logical nodes defined in the schema and a principle of a minimum aggregation cost, to generate a logical node diagram, and finally generates a physical node diagram according to a logical node diagram and a cluster resource. In addition, the master node delivers the physical node diagram to a processing node, so that the processing node determines a structure of a to-be-computed data cube data cube of the processing node according to the physical node diagram, when receiving a query command delivered by the master node, performs an aggregation operation on a data stream received by the processing node, to generate a data cube, and sends the data cube to the master node. According to the method provided in this embodiment, an aggregation operation can be separately performed on a data stream by using multiple processing nodes, to generate data cubes of different structures; and when a distributed system includes multiple physical machines, a data stream can be aggregated into data cubes of different structures by using the multiple physical machines, thereby accelerating data cube computing, and improving the efficiency of querying a data cube by a client.

Figure 12:
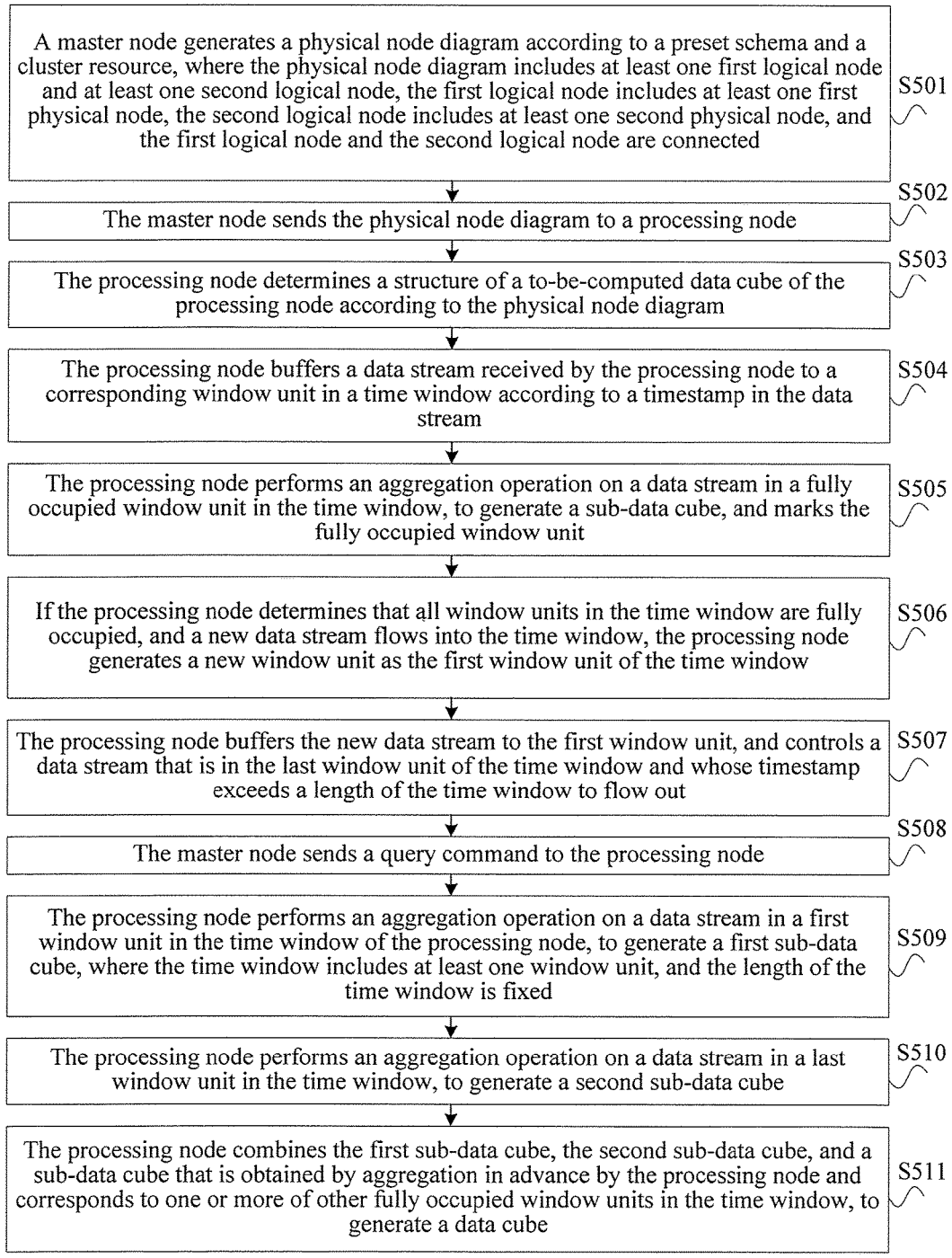
FIG. 12 is a schematic flowchart of Embodiment 5 of a method for creating a data cube in a streaming manner based on a distributed system according to the present invention.

FIG. 12 is a schematic flowchart of Embodiment 5 of a method for creating a data cube in a streaming manner based on a distributed system according to the present invention. The method involved in this embodiment describes an overall procedure in which a master node generates a physical node diagram, and delivers the physical node diagram to a processing node, and the processing node generates a data cube according to the physical node diagram. As shown in FIG. 12, the method includes:

S501: The master node generates a physical node diagram according to a preset schema and a cluster resource, where the physical node diagram includes at least one first logical node and at least one second logical node, the first logical node includes at least one first physical node, the second logical node includes at least one second physical node, and the first logical node and the second logical node are connected.

Specifically, the master node generates the physical node diagram according to the preset schema and the cluster resource, where the preset schema herein may be uploaded to the master node by an administrator, or may be obtained by the master node by using a valid resource such as a website or a database; and the cluster resource herein may be at least one physical machine. The master node generates a node level diagram by parsing the schema and according to level dependence in the schema. The node level diagram is used for showing a level relationship (that is, level dependence between different nodes in the node level diagram) between different data cubes, and each node in the node level diagram indicates a data cube of one structure. Reference may be made to FIG. 3 for a model of the schema, and reference may be made to FIG. 4 for the node level diagram. Reference may be made to Embodiment 1 or Embodiment 4 for specific descriptions about FIG. 3 and FIG. 4, and details are not described herein again.

The master node establishes an aggregation relationship between the first logical nodes according to all logical nodes defined in the schema and a principle of a minimum aggregation cost; and generates, according to the aggregation relationship, the node level diagram, and all the logical nodes defined in the schema, a logical node diagram shown in FIG. 5. Reference may be made to Embodiment 1 or Embodiment 4 for a specific description about FIG. 5, and details are not described herein again.

Then, the master node generates, according to the logical node diagram and the cluster resource, a physical node diagram shown in FIG. 6, that is, the master node deploys a physical node on a corresponding logical node according to a parallelism degree of each logical node. The physical node diagram includes at least one first logical node and at least one second logical node, the first logical node includes at least one first physical node, and the second logical node includes at least one second physical node. Reference may be made to Embodiment 1 or Embodiment 4 for a specific description about FIG. 6, and details are not described herein again.

Finally, the master node delivers an instruction to some physical nodes in the physical node diagram, the physical nodes receiving the instruction serve as processing nodes, and the master node delivers the physical node diagram to these processing nodes.

S502: The master node sends the physical node diagram to the processing node.

S503: The processing node determines a structure of a to-be-computed data cube of the processing node according to the physical node diagram.

Specifically, the processing node may obtain a level structure of the to-be-computed data cube of the processing node according to the physical node diagram, and each processing node corresponds to a data cube of at least one structure, that is, data streams may be aggregated into different data cubes. Herein, there may be one processing node or may be multiple processing nodes. That is, each processing node may receive the physical node diagram sent by the master node, and learns a structure of a data cube of each processing node according to the physical node diagram. In the physical node diagram shown in FIG. 6, a data cube 1, a data cube 2, a data cube 3, and a data cube 4 all refer to data cubes of different structures. That is, in this embodiment, a data stream may be aggregated into data cubes of different structures by using multiple processing nodes, so as to perform OLAP analysis. When the distributed system includes multiple physical machines, these processing nodes may each correspond to a physical machine. That is, in this embodiment, a data stream may be aggregated into data cubes of different structures by using multiple physical machines, so as to perform OLAP analysis, and therefore, fast processing is achieved. Certainly, the method in this embodiment is also applicable to a scenario in which the distributed system includes only one physical machine.

However, in the prior art, data streams are aggregated into data cubes of multiple structures by using one physical machine; therefore, computing is slow, and an overhead of the physical machine is relatively high.

S504: The processing node buffers a data stream received by the processing node to a corresponding window unit in a time window according to a timestamp in the data stream.

Specifically, as shown in FIG. 6, a timestamp is added to a data stream S1 on a second physical node of a second logical node (Node0), to generate a stream S1', where the timestamp indicates a moment at which the data stream S1 flows into the second logical node; the stream S1' needs to flow into all first logical nodes (Node1, Node3) at a next level; in the Node1, the stream S1' can enter only one of first physical nodes, where the first physical node is a processing node; and the processing node stores the data stream S1' in a corresponding window unit in a time window according to the timestamp in the S1'. The time window of the processing node includes at least one window unit, and each window unit includes at least one buffer unit for storing a tuple. Referring to FIG. 9, the time window includes eight window units (unit1-unit8). Because data streams flow into the processing node one by one in a streaming manner, that is, the data streams are actually stored in the window units in the time window of the processing node one by one. Generally, according to a timestamp in a data stream, a data stream that flows into the processing node first is stored in the last window unit, a data stream that subsequently flows into the processing node is stored in a former window unit in a queue-like form, and a data stream that flows into the processing node last is stored in the first window unit of the time window.

S505: The processing node performs an aggregation operation on a data stream in a fully occupied window unit in the time window, to generate a sub-data cube, and marks the fully occupied window unit.

When any window unit in the time window is fully occupied with data streams, the processing node performs an aggregation operation, as shown in FIG. 7, on the data streams in the fully occupied window unit, to generate a sub-data cube, and marks the fully occupied window unit as a computed unit.

S506: If the processing node determines that all window units in the time window are fully occupied, and a new data stream flows into the time window, the processing node generates a new window unit as the first window unit of the time window.

S507: The processing node buffers the new data stream to the first window unit, and controls a data stream that is in the last window unit of the time window and whose timestamp exceeds a length of the time window to flow out.

Specifically, the processing node performs an aggregation operation, as shown in FIG. 7, on each fully occupied window unit, and marks the fully occupied window unit. When the processing node determines that all window units in the time window are fully occupied, and a new data stream flows into the time window, the processing node generates a new window unit (referring to unit1' shown in FIG. 9) as the first window unit of the time window, to store the new data stream. In addition, when the new data stream flows into the first window unit, because a time length of the time window is fixed, the processing node controls a data stream that is in the last window unit of the time window to flow out, where a time indicated by a timestamp of the data stream exceeds the length of the time window; however, sub-data cubes generated in window units (original unit1-unit7) in the middle of the time window are not changed.

S508: The master node sends a query command to the processing node.

Specifically, the query command sent by the master node may be a statement for querying a data cube, where the statement for querying a data cube is sent by a client to the master node; and after parsing the statement for querying, the master node determines a to-be-queried logical node, that is, learns a logical node corresponding to a structure of a data cube that the client wants to query. Then, the master node sends the query command to the processing node, to obtain a corresponding data cube.

S509: The processing node performs an aggregation operation on a data stream in a first window unit in the time window of the processing node, to generate a first sub-data cube, where the time window includes at least one window unit, and the length of the time window is fixed.

S510: The processing node performs an aggregation operation on a data stream in a last window unit in the time window, to generate a second sub-data cube.

Specifically, a new data stream continuously flows into the first window unit in the time window, and a data stream also continuously flows out of the last window unit. When the processing node receives a query command sent by a master node, the processing node performs an aggregation operation on a data stream in a first window unit (at this time, the first window unit has not been fully occupied with data streams), to generate a first sub-data cube; and performs an aggregation operation on a remaining data stream in the last window unit, to generate a second sub-data cube.

S511: The processing node combines the first sub-data cube, the second sub-data cube, and a sub-data cube that is obtained by aggregation in advance by the processing node and corresponds to one or more of other fully occupied window units in the time window, to generate a data cube.

Specifically, because fully occupied window units in the middle of the time window are not affected, sub-data cubes generated in advance in the window units also keep an original state; therefore, the processing node needs to combine only the first sub-data cube, the second sub-data cube, and sub-data cubes correspond to other fully occupied window units (the original unit1-unit7) in the time window, to generate a data cube of the processing node.

According to the method for creating a data cube in a streaming manner based on a distributed system that is provided in this embodiment of the present invention, a time window of a processing node is divided into at least one window unit, and an aggregation operation is performed on a data stream in a fully occupied window unit in advance, to generate a sub-data cube; when the time window is fully occupied and a new data stream flows into the time window, a new window unit is generated as the first window unit of the time window; an aggregation operation is performed separately on a data stream in a first window unit and a data stream in a last window unit, to generate a first sub-data cube and a second sub-data cube; and finally, the first sub-data cube, the second sub-data cube, and a sub-data cube corresponding to one or more of other fully occupied window units in the time window are combined, to generate a data cube corresponding to the processing node. According to the method provided in this embodiment of the present invention, query time of a computer is effectively reduced and a query speed is increased.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Figure 13:
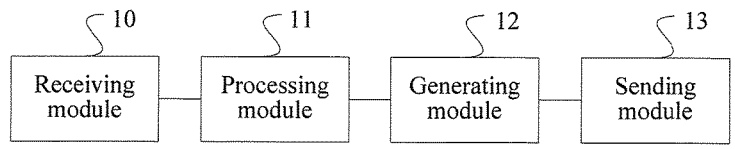
FIG. 13 is a schematic structural diagram of Embodiment 1 of an apparatus for creating a data cube in a streaming manner based on a distributed system according to the present invention.

FIG. 13 is a schematic structural diagram of Embodiment 1 of an apparatus for creating a data cube in a streaming manner based on a distributed system according to the present invention. The distributed system includes a master node, at least one first physical node, and at least one second physical node. The apparatus may be a processing node, or may be integrated in a processing node. As shown in FIG. 13, the apparatus includes: a receiving module 10, a processing module 11, a generating module 12, and a sending module 13. The receiving module 10 is configured to receive a physical node diagram sent by the master node, where the physical node diagram is generated by the master node according to a preset schema and a cluster resource, the apparatus is any first physical node of a first logical node in the physical node diagram, the physical node diagram includes at least one first logical node and at least one second logical node, the first logical node includes at least one first physical node, the second logical node includes at least one second physical node, and the first logical node and the second logical node are connected. The processing module 11 is configured to determine a structure of a to-be-computed data cube of the processing module according to the physical node diagram. The generating module 12 is configured to: when the receiving module 10 receives a query command sent by the master node, perform, according to the structure of the to-be-computed data cube of the processing node, an aggregation operation on a data stream received by the processing node, to generate a data cube, where the data stream carries a timestamp added by the second physical node to the data stream, and the timestamp indicates a moment at which the data stream flows into the second logical node . The sending module 13 is configured to send the data cube to the master node.

The apparatus for creating a data cube in a streaming manner based on a distributed system that is provided in this embodiment of the present invention can execute Embodiment 1 of the foregoing method, where an implementation principle and a technical effect thereof are similar and are not described herein again.

Figure 14:
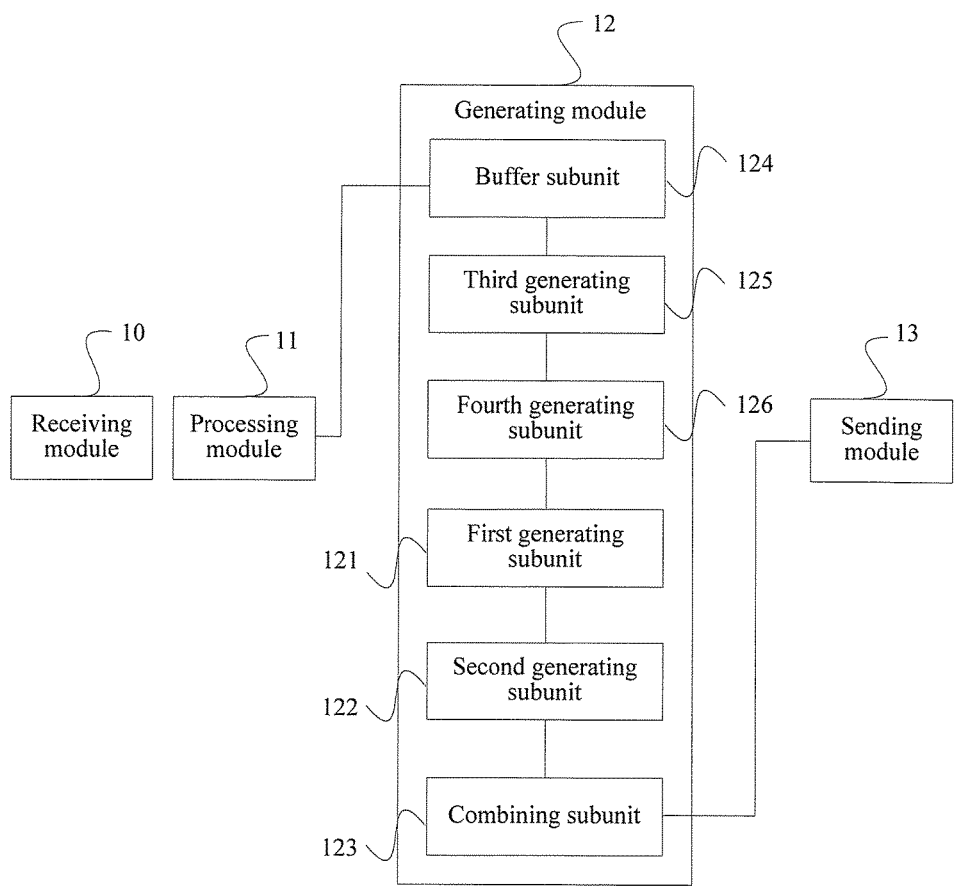
FIG. 14 is a schematic structural diagram of Embodiment 2 of an apparatus for creating a data cube in a streaming manner based on a distributed system according to the present invention.

FIG. 14 is a schematic structural diagram of Embodiment 2 of an apparatus for creating a data cube in a streaming manner based on a distributed system according to the present invention. Based on the embodiment shown in FIG. 13, further, the generating module 12 includes: a first generating subunit 121, configured to perform an aggregation operation on a data stream in a first window unit in a time window of the apparatus, to generate a first sub-data cube, where the time window includes at least one window unit, and a length of the time window is fixed; a second generating subunit 122, configured to perform an aggregation operation on a data stream in a last window unit in the time window, to generate a second sub-data cube; and a combining subunit 123, configured to combine the first sub-data cube, the second sub-data cube, and a sub-data cube that is obtained by aggregation in advance by the processing node and corresponds to one or more of other fully occupied window units in the time window, to generate the data cube.

Further, the generating module 12 further includes: a buffer subunit 124, configured to: before the first generating subunit 121 generates the first sub-data cube, buffer a data stream received by the buffer subunit to a corresponding window unit in the time window according to a timestamp in the data stream; a third generating subunit 125, configured to perform an aggregation operation on a data stream in a fully occupied window unit in the time window, to generate a sub-data cube, and mark the fully occupied window unit; and a fourth generating subunit 126, configured to: if the apparatus determines that all window units in the time window are fully occupied, and a new data stream flows into the time window, generate a new window unit as the first window unit of the time window, where the buffer subunit 124 is further configured to buffer the new data stream to the first window unit, and control a data stream that is in the last window unit of the time window and whose timestamp exceeds the length of the time window to flow out.

Further, the physical node diagram further includes an aggregation relationship that is established between the first logical nodes by the master node according to a principle of a minimum aggregation cost, and the data stream received by the buffer subunit 124 includes: a basic data stream sent by an upper-level apparatus of the apparatus, where the basic data stream is a data stream on which an aggregation operation has not been performed, and the upper-level apparatus is a physical node of a parent logical node of a first logical node on which the apparatus is located; or a sub-data cube sent by an upper-level apparatus of the apparatus, where the sub-data cube is a data stream on which an aggregation operation has been performed.

The apparatus for creating a data cube in a streaming manner based on a distributed system that is provided in this embodiment of the present invention can execute Embodiment 2 of the foregoing method, where an implementation principle and a technical effect thereof are similar and are not described herein again.

Figure 15:
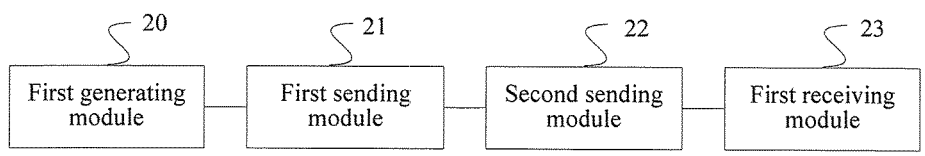
FIG. 15 is a schematic structural diagram of Embodiment 3 of an apparatus for creating a data cube in a streaming manner based on a distributed system according to the present invention.

FIG. 15 is a schematic structural diagram of Embodiment 3 of an apparatus for creating a data cube in a streaming manner based on a distributed system according to the present invention. The distributed system includes the apparatus, at least one first physical node, and at least one second physical node. The apparatus may be a master node, or may be integrated in a master node. As shown in FIG. 15, the apparatus includes: a first generating module 20, a first sending module 21, a second sending module 22, and a first receiving module 23. The first generating module 20 is configured to generate a physical node diagram according to a preset schema and a cluster resource, where the physical node diagram includes at least one first logical node and at least one second logical node, the first logical node includes at least one first physical node, the second logical node includes at least one second physical node, and the first logical node and the second logical node are connected. The first sending module 21 is configured to send the physical node diagram to a processing node, so that the processing node determines a structure of a to-be-computed data cube of the processing node according to the physical node diagram, where the processing node is any first physical node of the first logical node in the physical node diagram. The second sending module 22 is configured to send a query command to the processing node, so that the processing node performs, according to the structure of the to-be-computed data cube of the processing node, an aggregation operation on a data stream received by the processing node, to generate a data cube, where the data stream carries a timestamp added by the second physical node to the data stream, and the timestamp indicates a moment at which the data stream flows into the second logical node. The first receiving module 23 is configured to receive the data cube sent by the processing node.

The apparatus for creating a data cube in a streaming manner based on a distributed system that is provided in this embodiment of the present invention can execute Embodiment 3 of the foregoing method, where an implementation principle and a technical effect thereof are similar and are not described herein again.

Figure 16:
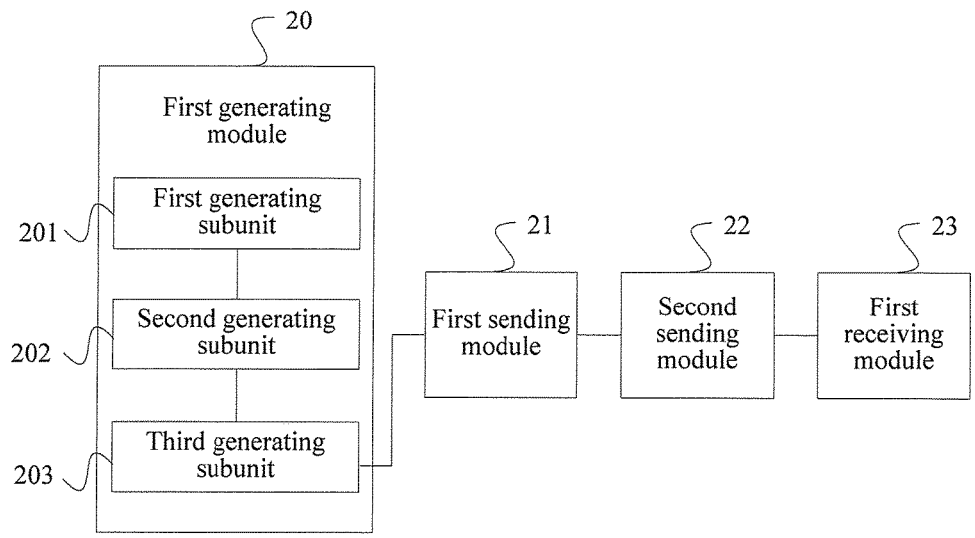
FIG. 16 is a schematic structural diagram of Embodiment 4 of an apparatus for creating a data cube in a streaming manner based on a distributed system according to the present invention.

FIG. 16 is a schematic structural diagram of Embodiment 4 of an apparatus for creating a data cube in a streaming manner based on a distributed system according to the present invention. Based on the embodiment shown in FIG. 15, further, the first generating module 20 specifically includes: a first generating subunit 201, configured to generate a node level diagram according to the preset schema, where the node level diagram is used for showing a level relationship between different data cubes, and each node in the node level diagram indicates a data cube of one structure; a second generating subunit 202, configured to establish an aggregation relationship between the first logical nodes according to a principle of a minimum aggregation cost; and generate a logical node diagram according to the aggregation relationship, the node level diagram, and all logical nodes defined in the schema; and a third generating subunit 203, configured to generate the physical node diagram according to the logical node diagram, a parallelism degree of all the logical nodes defined in the schema, and the cluster resource.

The apparatus for creating a data cube in a streaming manner based on a distributed system that is provided in this embodiment of the present invention can execute Embodiment 4 of the foregoing method, where an implementation principle and a technical effect thereof are similar and are not described herein again.

Figure 17:
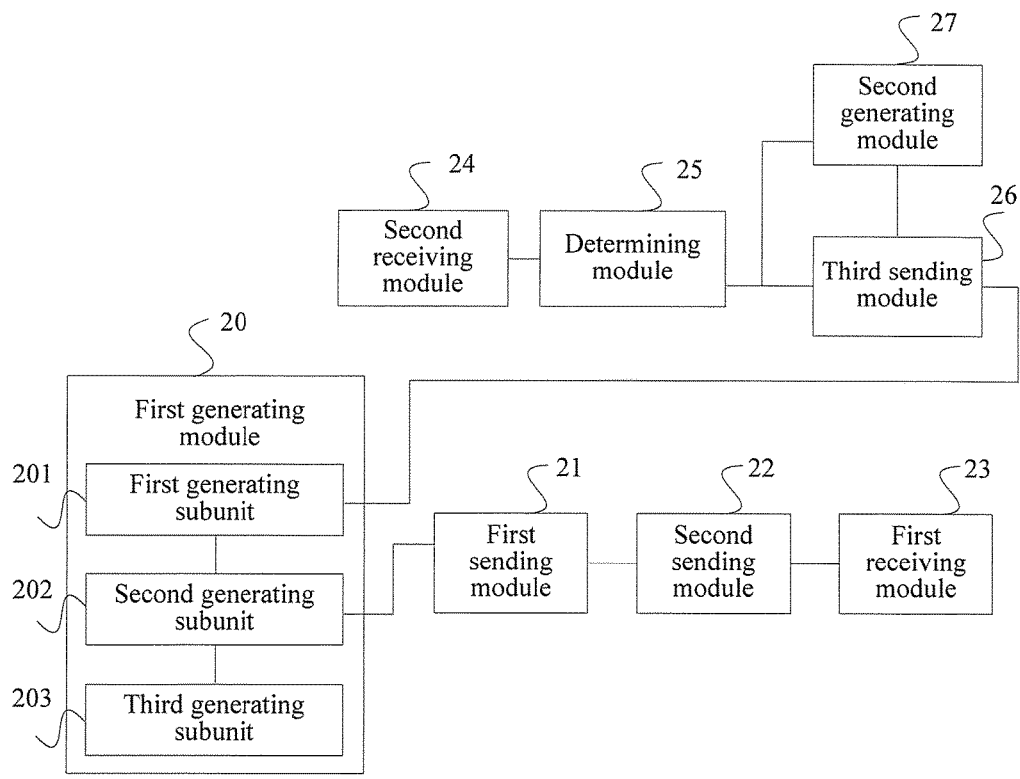
FIG. 17 is a schematic structural diagram of Embodiment 5 of an apparatus for creating a data cube in a streaming manner based on a distributed system according to the present invention.

FIG. 17 is a schematic structural diagram of Embodiment 5 of an apparatus for creating a data cube in a streaming manner based on a distributed system according to the present invention. Based on the embodiment shown in FIG. 16, further, the apparatus further includes: a second receiving module 24, configured to: before the second sending module sends the query command to the processing node, receive a query statement sent by a client; and a determining module 25, configured to determine a to-be-queried logical node according to the query statement.

Further, the apparatus may further include: a third sending module 26, and the third sending module 26 is configured to: if the to-be-queried logical node is a first logical node on which the processing node is located, send the data cube to the client.

Further, the apparatus may further include: a second generating module 27. If the to-be-queried logical node is a third logical node and the third logical node is a node that is not in the physical node diagram, the determining module 25 is further configured to determine, according to a node level diagram and a principle of a minimum aggregation cost, that the first logical node on which the processing node is located is a logical node from which aggregation is performed to the third logical node at a minimum cost. The second generating module 27 is configured to perform, according to a structure of a data cube on the third logical node, an aggregation operation on the data cube sent by the processing node, to generate a new data cube. The third sending module 26 is further configured to send the new data cube to the client.

The apparatus for creating a data cube in a streaming manner based on a distributed system that is provided in this embodiment of the present invention can execute Embodiment 4 of the foregoing method, where an implementation principle and a technical effect thereof are similar and are not described herein again.

Finally, it should be noted that the foregoing embodiments are merely intended for describing the technical solutions of the present invention, but are not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof; however, these modifications or replacements do not make the essence of corresponding technical solutions depart from the scope of the technical solutions in the embodiments of the present invention.

What is claimed is:

1. A method for creating a data cube in a streaming manner based on a distributed system, wherein the distributed system comprises a master node, at least one first physical node, and at least one second physical node, the method comprising:
receiving, by a processing node, a physical node diagram sent by the master node, wherein the physical node diagram is generated by the master node according to a preset schema and a cluster resource, the processing node is any first physical node of a first logical node in the physical node diagram, the physical node diagram comprises at least one first logical node and at least one second logical node, the first logical node comprises at least one first physical node, the second logical node comprises at least one second physical node, and the first logical node and the second logical node are connected;

determining, by the processing node, a structure of a to-be-computed data cube of the processing node according to the physical node diagram;

when the processing node receives a query command sent by the master node, performing, by the processing node according to the structure of the to-be-computed data cube of the processing node, an aggregation operation on a data stream received by the processing node, to generate a data cube, wherein the data stream carries a timestamp added by the second physical node to the data stream, and the timestamp indicates a moment at which the data stream flows into the second logical node, wherein performing, by the processing node according to the structure of the to-be-computed data cube of the processing node, the aggregation operation on the data stream received by the processing node, to generate the data cube comprises:

performing, by the processing node, an aggregation operation on the data stream in a first window unit in a time window of the processing node, to generate a first sub-data cube, wherein the time window comprises at least one window unit, and a length of the time window is fixed, performing, by the processing node, an aggregation operation on the data stream in a last window unit in the time window, to generate a second sub-data cube, and combining, by the processing node, the first sub-data cube, the second sub-data cube, and a sub-data cube that is obtained by aggregation in advance by the processing node and corresponds to one or more of other fully occupied window units in the time window, to generate the data cube; and sending, by the processing node, the data cube to the master node.

2. The method according to claim 1, before performing, by the processing node, an aggregation operation on a data stream in a first window unit in a time window of the processing node, to generate a first sub-data cube, further comprising:

buffering, by the processing node, the data stream received by the processing node to a corresponding window unit in the time window according to the timestamp in the data stream;

performing, by the processing node, an aggregation operation on a data stream in a fully occupied window unit in the time window, to generate a sub-data cube, and marking the fully occupied window unit;

when the processing node determines that all window units in the time window are fully occupied, and a new data stream flows into the time window, generating, by the processing node, a new window unit as the first window unit of the time window; and buffering, by the processing node, the new data stream to the first window unit, and controlling a data stream that is in the last window unit of the time window and whose timestamp exceeds the length of the time window to flow out.

3. The method according to claim 1, wherein the physical node diagram further comprises an aggregation relationship that is established between the first logical nodes by the master node according to a principle of a minimum aggregation cost, and the data stream received by the processing node comprises:

a basic data stream sent by an upper-level processing node of the processing node, wherein the basic data stream is a data stream on which an aggregation operation has not been performed, and the upper-level processing node is a physical node of a parent logical node of a first logical node on which the processing node is located; or a sub-data cube sent by an upper-level processing node of the processing node, wherein the sub-data cube is a data stream on which an aggregation operation has been performed.

4. A method for creating a data cube in a streaming manner based on a distributed system, wherein the distributed system comprises a master node, at least one first physical node, and at least one second physical node, the method comprising:

generating, by the master node, a physical node diagram according to a preset schema and a cluster resource, wherein the physical node diagram comprises at least one first logical node and at least one second logical node, the first logical node comprises at least one first physical node, the second logical node comprises at least one second physical node, and the first logical node and the second logical node are connected, wherein generating, by the master node, the physical node diagram according to the preset schema and the cluster resource comprises:

generating, by the master node, a node level diagram according to the preset schema for showing a level relationship between different data cubes, and each node in the node level diagram indicates a data cube of one structure, establishing, by the master node, an aggregation relationship between the first logical nodes according to a principle of a minimum aggregation cost, and generating a logical node diagram according to the aggregation relationship, the node level diagram, and all logical nodes defined in the schema, and generating, by the master node, the physical node diagram according to the logical node diagram, a parallelism degree of all the logical nodes defined in the schema, and the cluster resource;

sending, by the master node, the physical node diagram to a processing node, so that the processing node determines a structure of a to-be-computed data cube of the processing node according to the physical node diagram, wherein the processing node is any first physical node of the first logical node in the physical node diagram;

sending, by the master node, a query command to the processing node to enable the processing node to perform, according to the structure of the to-be-computed data cube of the processing node, an aggregation operation on a data stream received by the processing node, to generate a data cube, wherein the data stream carries a timestamp added by the second physical node to the data stream, and the timestamp indicates a moment at which the data stream flows into the second logical node; and receiving, by the master node, the data cube sent by the processing node.

5. The method according to claim 4, before sending, by the master node, a query command to the processing node, further comprising:

receiving, by the master node, a query statement sent by a client; and determining, by the master node, a to-be-queried logical node according to the query statement.

6. The method according to claim 5, wherein when the to-be-queried logical node is a first logical node on which the processing node is located, the master node sends the data cube to the client.

7. The method according to claim 5, wherein when the to-be-queried logical node is a third logical node and the third logical node is a node that is not in the physical node diagram, determining, by the master node, according to a node level diagram and a principle of a minimum aggregation cost, that a first logical node on which the processing node is located is a logical node from which aggregation is performed to the third logical node at a minimum cost;

performing, by the master node, according to a structure of a data cube on the third logical node, an aggregation operation on the data cube sent by the processing node, to generate a new data cube; and sending, by the master node, the new data cube to the client.

8. An apparatus for creating a data cube in a streaming manner based on a distributed system, wherein the distributed system comprises a master node, at least one first physical node, and at least one second physical node, and the apparatus comprises:

a processor;

memory coupled to the processor, the memory comprising instructions that, when executed by the processor, cause the apparatus to:

receive a physical node diagram sent by the master node, wherein the physical node diagram is generated by the master node according to a preset schema and a cluster resource, the apparatus is any first physical node of a first logical node in the physical node diagram, the physical node diagram comprises at least one first logical node and at least one second logical node, the first logical node comprises at least one first physical node, the second logical node comprises at least one second physical node, and the first logical node and the second logical node are connected;

determine a structure of a to-be-computed data cube according to the physical node diagram;

when a query command sent by the master node is received, performing, according to the structure of the to-be-computed data cube, an aggregation operation on a received data stream, to generate a data cube, wherein the data stream carries a timestamp added by the second physical node to the data stream, and the timestamp indicates a moment at which the data stream flows into the second logical node, wherein to perform the aggregation operation, the memory comprises instructions that, when executed by the processor, cause the apparatus to:

perform an aggregation operation on the data stream in a first window unit in a time window of the apparatus, to generate a first sub-data cube, wherein the time window comprises at least one window unit, and a length of the time window is fixed;

perform an aggregation operation on the data stream in a last window unit in the time window, to generate a second sub-data cube; and combine the first sub-data cube, the second sub-data cube, and a sub-data cube that is obtained by aggregation in advance by a processing node and corresponds to one or more of other fully occupied window units in the time window, to generate the data cube; and send the data cube to the master node.

9. The apparatus according to claim 8, wherein the memory further comprises instructions that, when executed by the processor, cause the apparatus to:

before the first sub-data cube is generated, buffer a data stream received by the buffer subunit to a corresponding window unit in the time window according to a timestamp in the data stream;

perform an aggregation operation on a data stream in a fully occupied window unit in the time window, to generate a sub-data cube, and mark the fully occupied window unit;

when the apparatus determines that all window units in the time window are fully occupied, and a new data stream flows into the time window, generate a new window unit as the first window unit of the time window; and buffer the new data stream to the first window unit, and control a data stream that is in the last window unit of the time window and whose timestamp exceeds the length of the time window to flow out.

10. The apparatus according to claim 8, wherein the physical node diagram further comprises an aggregation relationship that is established between the first logical nodes by the master node according to a principle of a minimum aggregation cost, and the data stream received by the buffer subunit comprises:

a basic data stream sent by an upper-level apparatus of the apparatus, wherein the basic data stream is a data stream on which an aggregation operation has not been performed, and the upper-level apparatus is a physical node of a parent logical node of a first logical node on which the apparatus is located; or a sub-data cube sent by an upper-level apparatus of the apparatus, wherein the sub-data cube is a data stream on which an aggregation operation has been performed.

11. An apparatus for creating a data cube in a streaming manner based on a distributed system, wherein the distributed system comprises the apparatus, at least one first physical node, and at least one second physical node, and the apparatus comprises:

a processor;

memory coupled to the processor, the memory comprising instructions that, when executed by the processor, cause the apparatus to:

generate a physical node diagram according to a preset schema and a cluster resource, wherein the physical node diagram comprises at least one first logical node and at least one second logical node, the first logical node comprises at least one first physical node, the second logical node comprises at least one second physical node, and the first logical node and the second logical node are connected;

generate a node level diagram according to the preset schema, wherein the node level diagram is used for showing a level relationship between different data cubes, and each node in the node level diagram indicates a data cube of one structure;

establish an aggregation relationship between the first logical nodes according to a principle of a minimum aggregation cost, and generate a logical node diagram according to the aggregation relationship, the node level diagram, and all logical nodes defined in the schema;

generate the physical node diagram according to the logical node diagram, a parallelism degree of all the logical nodes defined in the schema, and the cluster resource;

send the physical node diagram to a processing node to enable the processing node to determine a structure of a to-be-computed data cube of the processing node according to the physical node diagram, wherein the processing node is any first physical node of the first logical node in the physical node diagram;

send a query command to the processing node to enable the processing node to perform, according to the structure of the to-be-computed data cube of the processing node, an aggregation operation on a data stream received by the processing node, to generate a data cube, wherein the data stream carries a timestamp added by the second physical node to the data stream, and the timestamp indicates a moment at which the data stream flows into the second logical node; and receive the data cube sent by the processing node.

12. The apparatus according to claim 11, wherein the memory further comprises instructions that, when executed by the processor, cause the apparatus to:

before the query command to the processing node is sent, receive a query statement sent by a client; and determine a to-be-queried logical node according to the query statement.

13. The apparatus according to claim 12, wherein the memory further comprises instructions that, when executed by the processor, cause the apparatus to: when the to-be-queried logical node is a first logical node on which the processing node is located, send the data cube to the client.

14. The apparatus according to claim 12, wherein the memory further comprises instructions that, when executed by the processor, cause the apparatus to:

when the to-be-queried logical node is a third logical node and the third logical node is a node that is not in the physical node diagram, determine, according to a node level diagram and a principle of a minimum aggregation cost, that a first logical node on which the processing node is located is a logical node from which aggregation is performed to the third logical node at a minimum cost;

perform, according to a structure of a data cube on the third logical node, an aggregation operation on the data cube sent by the processing node, to generate a new data cube; and send the new data cube to the client.

* * * * *